United States Patent
Loth et al.

(10) Patent No.: US 11,466,660 B2
(45) Date of Patent: Oct. 11, 2022

(54) MORPHING SEGMENTED WIND TURBINE AND RELATED METHOD

(71) Applicants: University of Virginia Patent Foundation, Charlottesville, VA (US); The Board of Trustees of the University of Illinois, Urbana, IL (US)

(72) Inventors: Eric Loth, Charlottesville, VA (US); Michael S. Selig, Mahomet, IL (US); Adam Steele, College Station, TX (US)

(73) Assignees: University of Virginia Patent Foundation, Charlottesville, VA (US); The Board of Trustees of the University of Illinois, Urbana, IL (US)

( * ) Notice: Subject to any disclaimer, the term of this patent is extended or adjusted under 35 U.S.C. 154(b) by 18 days.

(21) Appl. No.: 16/719,612

(22) Filed: Dec. 18, 2019

(65) Prior Publication Data

US 2020/0141384 A1     May 7, 2020

Related U.S. Application Data

(63) Continuation of application No. 15/649,794, filed on Jul. 14, 2017, now abandoned, which is a
(Continued)

(51) Int. Cl.
*F03D 1/06*     (2006.01)

(52) U.S. Cl.
CPC .... *F03D 1/0675* (2013.01); *F05B 2240/2213* (2013.01); *F05B 2240/302* (2013.01);
(Continued)

(58) Field of Classification Search
CPC ............ F05B 2240/31; F05B 2240/311; F05B 2240/302; F05B 2240/2022;
(Continued)

(56) References Cited

U.S. PATENT DOCUMENTS

| 3,981,613 A | 9/1976 | Ehrenskjold et al. |
| 4,095,918 A | 6/1978 | Mouton, Jr. et al. |

(Continued)

FOREIGN PATENT DOCUMENTS

| DE | 3107252 A1 | 9/1982 |
| DE | 3126677 A1 | 1/1983 |

(Continued)

OTHER PUBLICATIONS

"U.S. Appl. No. 13/528,753, Final Office Action dated Oct. 20, 2015", 9 pgs.
(Continued)

*Primary Examiner* — Richard A Edgar
(74) *Attorney, Agent, or Firm* — Schwegman Lundberg & Woessner, P.A.

(57) ABSTRACT

A downwind morphing rotor that exhibits bending loads that will be reduced by aligning the rotor blades with the composite forces. This reduces the net loads on the blades which therefore allow for a reduced blade mass for a given maximum stress. The downwind morphing varies the amount of downstream deflection as a function of wind speed, where the rotor blades are generally fully-aligned to non-azimuthal forces for wind speeds between rated and cut-out conditions, while only the outer segments of the blades are generally aligned between cut-in and rated wind speeds. This alignment for large (MW-scale) rated turbines results in much larger downstream deflections of the blades at high wind speeds as compared to that of a conventional rigid single-piece upwind turbine blade.

14 Claims, 12 Drawing Sheets

Related U.S. Application Data continuation of application No. 13/528,753, filed on Jun. 20, 2012, now Pat. No. 9,709,029.

(60) Provisional application No. 61/661,513, filed on Jun. 19, 2012, provisional application No. 61/499,507, filed on Jun. 21, 2011.

(52) U.S. Cl.
CPC ......... *F05B 2240/311* (2013.01); *Y02E 10/72* (2013.01); *Y10T 29/49337* (2015.01)

(58) Field of Classification Search
CPC ........ F05B 2240/313; F05B 2240/9121; F05B 2240/93; F03D 7/0236; F03D 7/313; F03D 13/25

See application file for complete search history.

(56) References Cited

U.S. PATENT DOCUMENTS

| | | | |
|---|---|---|---|
| 4,105,363 A | 8/1978 | Loth | |
| 4,197,056 A | 4/1980 | Hutter | |
| 4,403,916 A | 9/1983 | Skelskey | |
| 4,469,956 A * | 9/1984 | D'Amato | F03D 13/22 290/55 |
| 4,522,561 A * | 6/1985 | Carter, Jr. | F03D 7/0252 416/11 |
| 4,533,297 A * | 8/1985 | Bassett | F03D 1/0658 416/132 B |
| 4,878,808 A | 11/1989 | Wildenauer | |
| 6,979,171 B2 * | 12/2005 | Lauritsen | F03D 13/25 415/908 |
| 7,186,083 B2 | 3/2007 | Bayly | |
| 7,740,453 B2 | 6/2010 | Zirin et al. | |
| 9,709,029 B2 | 7/2017 | Loth et al. | |
| 2007/0098555 A1* | 5/2007 | Siegfriedsen | F03D 1/0608 416/132 B |
| 2008/0124216 A1 | 5/2008 | Liao | |
| 2008/0240923 A1 | 10/2008 | Bonnet | |
| 2009/0162208 A1 | 6/2009 | Zirin et al. | |
| 2009/0208337 A1 | 8/2009 | Chambers et al. | |
| 2010/0028161 A1 | 2/2010 | Vronsky et al. | |
| 2010/0040477 A1 | 2/2010 | Moehring | |
| 2010/0086407 A1 | 4/2010 | Holmoy | |
| 2010/0132884 A1 | 6/2010 | Baehmann et al. | |
| 2010/0143131 A1* | 6/2010 | Pitre | F03D 1/0658 416/85 |
| 2010/0143143 A1 | 6/2010 | Judge | |
| 2010/0172759 A1 | 7/2010 | Sullivan | |
| 2011/0038726 A1 | 2/2011 | Elkin et al. | |
| 2011/0255974 A1* | 10/2011 | Nanukuttan | F03D 7/0236 416/146 R |
| 2013/0064663 A1 | 3/2013 | Loth et al. | |
| 2020/0173422 A1 | 6/2020 | Casanovas Bermejo et al. | |

FOREIGN PATENT DOCUMENTS

| | | | |
|---|---|---|---|
| DE | 3637678 A1 | 5/1988 | |
| EP | 1953383 A1 | 8/2008 | |
| FR | 2937687 A1 | 4/2010 | |
| GB | 2353825 A * | 3/2001 | F03D 1/04 |
| JP | 2005147085 A | 6/2005 | |
| WO | WO-2009130212 A1 | 10/2009 | |
| WO | WO-2009135902 A2 | 11/2009 | |

OTHER PUBLICATIONS

"U.S. Appl. No. 13/528,753, Non Final Office Action dated Mar. 2, 2015", 12 pgs.
"U.S. Appl. No. 13/528,753, Non Final Office Action dated May 24, 2016", 7 pgs.
"U.S. Appl. No. 13/528,753, Notice of Allowance dated Mar. 28, 2017", 5 pgs.
"U.S. Appl. No. 13/528,753, Response filed Apr. 20, 2016 to Final Office Action dated Oct. 20, 2015", 12 pgs.
"U.S. Appl. No. 13/528,753, Response filed Sep. 2, 2015 to Non Final Office Action dated Mar. 2, 2015", 10 pgs.
"U.S. Appl. No. 13/528,753, Response filed Nov. 23, 2016 to Non Final Office Action dated May 24, 2016", 9 pgs.
Ashwill, "Materials and Innovations for Large Blade Structures: Research Opportunities in Wind Energy Technology", 50th AIAA Structures, Structural Dynamics, & Materials Conference, Paper AIAA-2009-2407, American Institute of Aeronautics and Astronautics, (May 2009), 21 pgs.
Crawford, "The Path From Functional to Detailed Design of a Coning Rotor Wind Turbine Concept", Proceedings of CDEN/C2E2 Conference, University of Manitoba Winnipeg, Manitoba., (Jul. 2007), 10 pgs.
Fingersh, "Wind Turbine Design Cost and Scaling Model", NREL Technical Report, NRELI TR-500-40566, National Renewable Energy Laboratory, Golden, CO., (2006), 43 pgs.
Gopalarathnam, "Low-Speed Natural-Laminar-Flow Airfoils: Case Study in Inverse Airfoil Design", Journal of Aircraft, vol. 38, No. 1, (Jan.-Feb. 2001), pp. 57-63.
Hillmer, "Aerodynamic and Structural Design of MultiMW Wind Turbine Blades beyond 5MW", Journal of Physics: Conference Series,vol. 75, IOP Publishing., (2007), 8 pgs.
Ichter, Brian, et al., "Amorphing downwind-aligned rotor concept based on a 13-MW wind turbine", Wind Energy, (2015), 13 pgs.
Jacobson, "Review of Solutions to Global Warming, Air Pollution, and Energy Security", Energy & Environmental Science, Issue 2., (2009), 148-173.
Jaiman, "Combined Interface Boundary Condition Method for Unsteady Fluid-Structure Interaction", Computer Methods in Applied Mechanics and Engineering, vol. 200, Issues 1-4., (Jan. 2011), 27-39.
Jaiman, "Conservative Load Transfer Along Curved Fluid-Solid Interface with Non-Matching Meshes", Journal of Computational Physics, vol. 218, Issue 1., (Oct. 10, 2006), 372-397.
Jaiman, "Transient Fluid-Structure Interaction with Non-Matching Spatial and Temporal Discretizations", Computers & Fluids, vol. 50, Issue 1., (Nov. 2011), 120-135.
Jonkman, "Definition of a 5-MW Reference Wind Turbine for Offshore System Development", Technical Report NREL/TP-500-38060, National Renewable Energy Laboratory., (Feb. 2009), 75 pgs.
Jordan, "Segmented and Self-Adjusting Wind Turbine Rotors", 12th IECEC, (1977), 1676-1683.
Lee, "Enhancing the Robustness of Aeroelastic instability Suppression Using Multi-Degree-of-Freedom Nonlinear Energy Sinks", AIAA Journal, vol. 46, No. 6., (Jun. 2008), 9 pgs.
Lindenberg, "20% Wind Energy by 2030: Increasing Wind Energy's Contribution to U.S. Electricity Supply", APP Wind Generation, U.S. Department of Energy., (Mar. 2, 2009), 29 pgs.
Loth, Eric, et al., "Morphing Segmented Wind Turbine Concept", 28th AIAA Applied Aerodynamics Conference, AIAA 2010-4400, [Online] Retrieved from the Internet: <URL: http://aerospace.illinois.edu/m-selig/pubs/LothSeligMoriarty-2010-AIAA-2010-4400-MorphingWindTurbine.pdf, (2010), 6 pgs.
Madsen, "Low Frequency Noise from Wind Turbines Mechanisms of Generation and its Modelling", Journal of Low Frequency Noise, Vibration and Active Control, 29(4), (Sep. 2011), 239-251.
Moriarty, "Semi-Empirical Aeroacoustic Noise Prediction Code for Wind Turbines", National Renewable Energy Laboratory, Technical Report, NREL Report No. TP-500-34478, (Dec. 2003), 39 pgs.
Rasmussen, "Soft Rotor Design for Flexible Turbines", Riso National Laboratory, Publishable Final Report, Contract JOU3-CT95-0062, Jan. 1, 1996-Jun. 30, 98, Roskilde, Denmark, 19 pgs.
Selig, "Application of a Genetic Algorithm to Wind Turbine Design", Journal of Energy Resources Technology, vol. 118., (Mar. 1996), 22-28.
Simms, "NREL Unsteady Aerodynamics Experiment in the NASA—Ames Wind Tunnel: A Comparison of Predictions to Measure-

(56) References Cited

OTHER PUBLICATIONS ments", National Renewable Energy Laboratory, Technical Report, NREL/TP-500-29494, (Jun. 2001), 51 pgs.

Simms, "Unsteady Aerodynamics Experiment Phases II IV Test Configurations and Available Data Campaigns", National Renewable Energy Laboratory, Technical Report, NRELI TP-500-25950, (Jul. 1999), 177 pgs.

Wilson, "Optimized Active Aerodynamic Blade Control for Load Alleviation on Large Wind Turbines", AWEA Windpower, Houston, Texas., (2008), 7 pgs.

"U.S. Appl. No. 15/649,794, Non Final Office Action dated Mar. 15, 2019", 9 pgs.

"U.S. Appl. No. 15/649,794, Notice of Non-Compliant Amendment dated Oct. 29, 2019", 4 pgs.

"U.S. Appl. No. 15/649,794, Preliminary Amendment filed Jul. 14, 2017", 6 pgs.

"U.S. Appl. No. 15/649,794, Preliminary Amendment filed Sep. 25, 2017", 5 pgs.

"U.S. Appl. No. 15/649,794, Response filed Sep. 12, 2019 to Non Final Office Action dated Mar. 15, 2019", 12 pgs.

"Machine Translation of DE 3126677 A1", Accessed by the Examiner from the EPO dated Mar. 12, 2019, (Retrieved Mar. 18, 2020), 3 pgs.

"Machine Translation of FR 2,937,687 A1", Accessed by the Examiner from the EPO dated Mar. 12, 2019, (Retrieved Mar. 18, 2020), 5 pgs.

"Machine Translation of JP2005-147085", Accessed by the Examiner from the EPO dated Mar. 12, 2019, (Retrieved Mar. 18, 2020), 4 pgs.

Loth, Eric, et al., "Downwind pre-aligned rotors for extreme-scale wind turbines", Wind Energy, 20(7), (2017), 1241-1259.

Noyes, Carlos, et al., "Analytic analysis of load alignment for coning extreme-scale rotors", Wind Energy, (2019), 13 pgs.

Noyes, Carlos, et al., "Extreme-scale load-aligning rotor: To hinge or not to hinge?", Applied Energy, 257, 113985, [Online] Retrieved from the Internet: <URL: https://www.sciencedirect.com/science/article/pii/S0306261919316721>, (Oct. 31, 2019), 11 pgs.

Noyes, Carlos, et al., "Pre-aligned downwind rotor for a 13.2 MW wind turbine", Renewable Energy, 16(A), (2016), 27 pgs.

Quinn, R., "A parametric investigation into the effect of low induction rotor (LIR) wind turbines on the levelised cost of electricity for a 1 GW offshore wind farm in a North Sea wind climate", Energy Procedia 94, (2016), 164-172.

Zalkind, Daniel S, et al., "System-level design studies for large rotors", Wind Energy Science, 4(4), (2019), 595-618.

U.S. Appl. No. 13/528,753, filed Jun. 20, 2012, Morphing Segmented Wind Turbine and Related Method.

U.S. Appl. No. 15/649,794, filed Jul. 14, 2017, Morphing Segmented Wind Turbine and Related Method.

\* cited by examiner

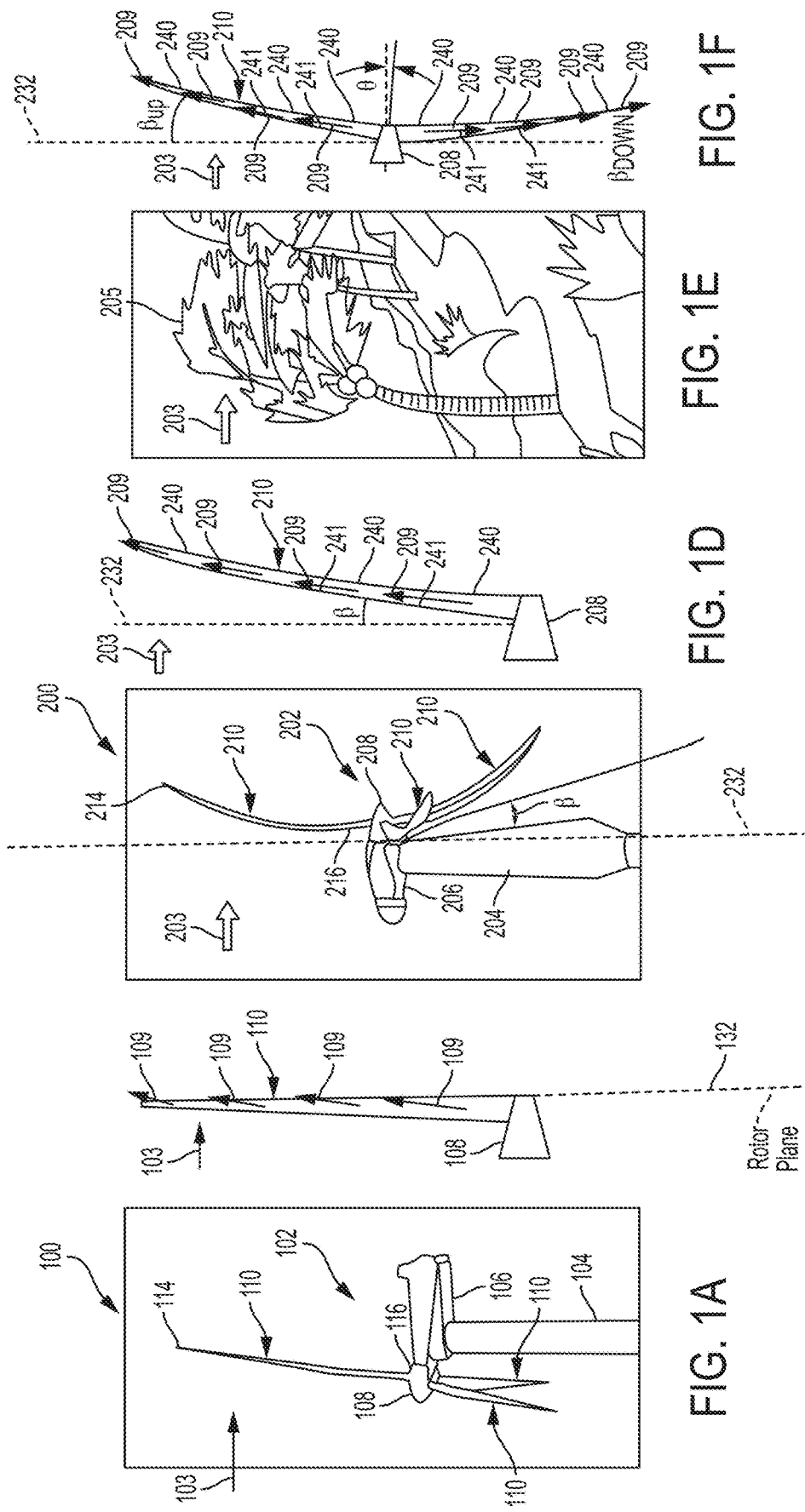

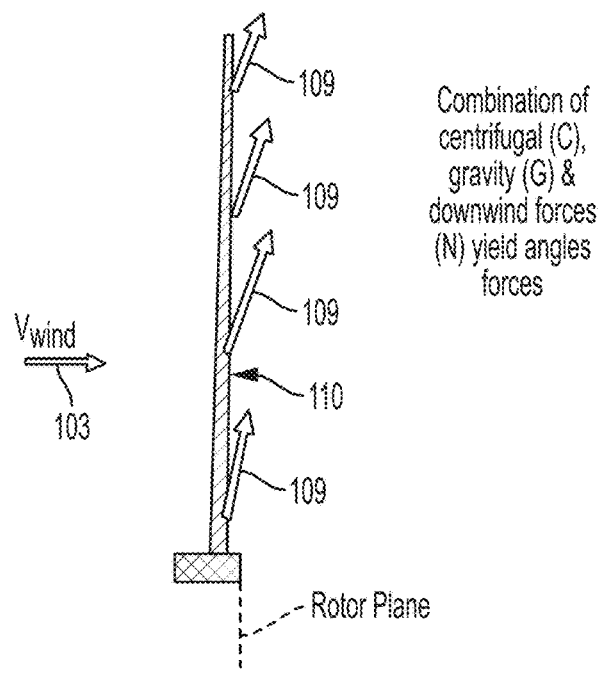
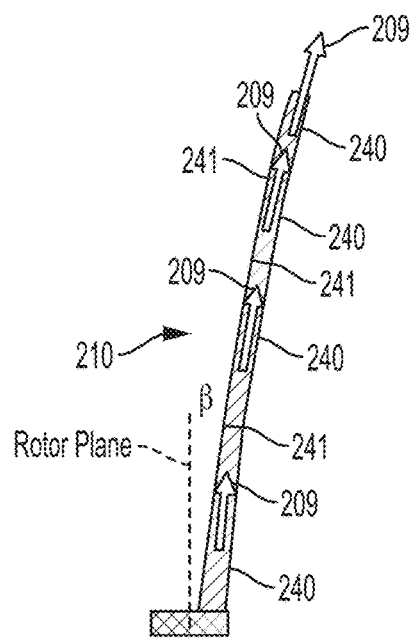
FIG. 2A
FIG. 2B
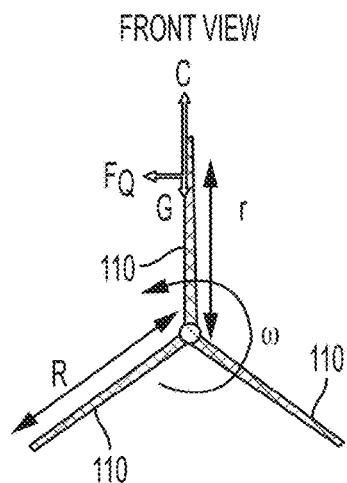
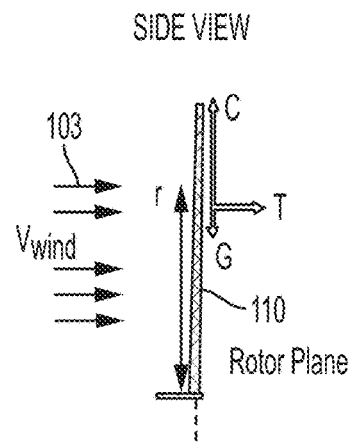
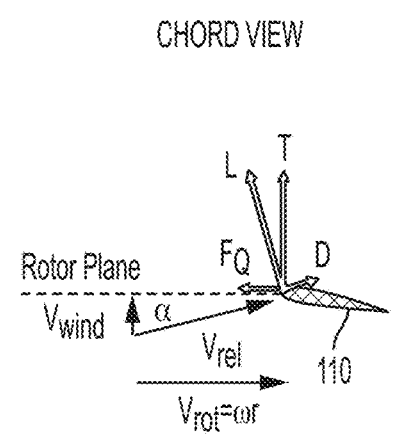
FIG. 3A
FIG. 3B
FIG. 3C

MORPHING SEGMENTED WIND TURBINE AND RELATED METHOD

CROSS-REFERENCE TO RELATED APPLICATIONS

The present application is a continuation application under 35 U.S.C. § 120 of U.S. patent application Ser. No. 15/649,794, filed Jul. 14, 2017, which is a continuation application under 35 U.S.C. § 120 of U.S. patent application Ser. No. 13/528,753, filed Jun. 20, 2012, which claims priority from U.S. Provisional Application Ser. No. 61/499,507, filed Jun. 21, 2011, entitled "Morphing Segmented Wind Turbine and Related Method" and U.S. Provisional Application Ser. No. 61/661,513, filed Jun. 19, 2012, entitled "Morphing Segmented Wind Turbine and Related Method;" the disclosures of which are hereby incorporated by reference herein in their entirety.

BACKGROUND OF THE INVENTION

Wind energy is a key to the nation's 2030 goals of increased energy independence and reduced environmental impact stemming from power generation (Lindenberg et al. 2008). It is projected to account for as much as 20% of U.S. power by 2030. This sustainable source will improve the nation's energy independence and allow a low environmental impact as compared to traditional fossil fuels in many ways. Firstly, it can reduce energy related emissions since the 20% wind penetration by 2030 is estimated by the U.S. Department of Energy (DOE) to avoid 2,100 million metric tons of carbon into the atmosphere. Secondly, estimates by Jacobsen (2009) indicate that 300 GW of wind power primarily used for charging electric-battery vehicles would eliminate 15,000 emissions-related deaths per year by 2020. This would also eliminate 15 million barrels per day of imported oil in the United States, reducing the amount of imported energy and increasing our energy independence and security.

Maintaining or lowering cost of energy while simultaneously ramping up total installed penetration may benefit from revolutionary advances in turbine concepts at extreme-scales (diameters of 120 meters and beyond) with improved efficiency. This increase in scale and efficiency has been evident in recent wind turbine design. The average wind turbine rated power has increased twenty-fold since 1985, with present systems averaging 2 MW. Economies of scale and higher winds aloft are driving systems to power levels of 5 MW and beyond with rotor diameters (D) nearing 120 m and greater. While larger systems are needed in the future, blade weight (currently proportional to $D^{2.35}$) has become a constraining design factor due to high gravity loads (Ashwill, 2009). This scaling is important since system costs generally scale linearly with system weight and the rotor itself accounts for about 23% of the initial total system cost (Fingersh, 2006). In addition, noise (and visual) production is likely to be very significant for extreme-scale systems indicating that such systems are best suited for off-shore siting. Such siting may also reduce many existing environmental impacts but leads to complications in terms of installation and maintenance. These problems are compounded by upwind turbine configurations since such designs necessitate stiff blades to avoid rotor-blade tower strikes. Moreover, overly rigid rotor/tower systems lead to problematic high frequency fatigue loads.

SUMMARY OF EXEMPLARY EMBODIMENTS OF THE INVENTION

A morphing segmented concept is submitted herein as an embodiment of the present invention for future extreme-scale wind turbine systems. Both "twist morphing" and "downwind morphing" can be employed.

The twist morphing pertaining to an embodiment of the present invention may be accomplished by using segmented blades connected by screw sockets and a tension cable system (as well as other available coupling mechanisms and tension control systems). At low wind and rotor speeds, the segmented blades may be, for example, fully tensioned and set at high pitch to ensure start-up and maximum power at low speeds. At high rotor rpm, the cable tension can be designed such that centrifugal forces drive the blade segments outward so as to unwind/feather the rotor and prevent over-speed. This effectively acts like a passive pitch control for rotor speeds. Perhaps more importantly, still referring to the "twist morphing" rotor the airfoils of the blade segments can be designed with a center of pressure downstream of the socket axis. This will cause an aerodynamic moment at high wind speeds which will serve to unwind the blade segments to prevent torque spikes and blade stall. For a given rotor diameter and torque, such stall prevention can permit operation at higher average lift coefficient with a reduced blade chord length which can reduce blade and overall system weight. In addition, the segmented blade concept can alleviate manufacturing and shipping constraints for extreme-scale systems. In the proposed concepts, the bending loads will be carried by the segmented rotor spar and not the blade skin. This may result in much larger downstream deflections of the blades at high wind speeds as compared to that of a conventional rigid single-piece turbine blade.

Pertaining to an embodiment of the "downwind morphing" rotor, the bending loads will be reduced by aligning the rotor blades with the composite forces. This reduces the net loads on the blades, which therefore allow a reduced blade mass for a given maximum stress. The downwind morphing varies the amount of downstream deflection as a function of wind speed, where the rotor blades are generally fully-aligned to non-azimuthal forces for wind speeds between rated and cut-out conditions, while only the outer segments of the blades are generally aligned between cut-in and rated wind speeds. This alignment for large (MW-scale) rated turbines results in much larger downstream deflections of the blades at high wind speeds as compared to that of a conventional rigid single-piece upwind turbine blade. Therefore, a downstream design would be needed for the downwind morphing to avoid potential strike of the blades with the tower. This will require a more aerodynamic tower to reduce wake interactions, but a downstream system may eliminate yaw-control and substantially relax blade rigidity constraints, thus further reducing blade weight. An aspect of an embodiment of the present invention rotor provides an aligned concept that employs a geometry that orients the loads (i.e., net force) along the blade length of the blade so that the structural loads primarily act in the tension mode. The blade may have two or more blade segments or portions that may be joined at blade segment joints so as to be able to fold or close (partially or fully) downwind. In general, for speeds significantly below rated conditions, the blades could be fixed on the vertical plane in order to maximize the swept area allowed with the longer length blades. As the wind speed approaches rated conditions, the blades could be gradually released in semi-alignment to reduce stresses. For rated speeds and above, the blades could be fully-aligned, though a dashpot-damper system may be needed to avoid problematic dynamics. Finally, at speeds significantly above cut-out conditions, the stopped blades could be closed-up towards the horizontal to allow a stow configuration for hurricane level winds.

An alternative embodiment to downwind morphing is a "pre-aligned" configuration, where the rotor geometry and orientation does not change with wind speed, and instead is fixed at a constant downwind deflection consistent with alignment at or near the rated wind speed conditions.

Another embodiment is morphing based on twist, where the airfoil-shapes around the spars twist relative to the wind due to aerodynamic forces so as to unload the rotors when there is a gust. This can help reduce unsteady stresses on the blade and therefore may allow for reduced blade mass and cost. It should be appreciated that twist morphing may be combined with either downwind morphing or it may be combined with pre-alignment.

An aspect of an embodiment of the present invention provides, but not limited thereto, a rotor blade for a wind turbine. The blade may comprise: a plurality of blade segments for use as part of a rotor; the plurality of blade segments may comprise an internal passage extending longitudinally from a first end to a second end of each of the blade segments; a plurality of spar members extending longitudinally through the internal passages of each of the blade segments such that the plurality of the spar members are aligned and in communication end-to-end through the internal passages and the plurality of blade segments are aligned and in communication with the aligned spar members and define a complete rotor blade from a root that connects to a rotor hub to a blade tip of the rotor blade; a tension member extending longitudinally through the aligned spar members; and the aligned spar members are configured to at least partially unwind due to centrifugal forces exerted on the blade segments and aligned spar members, the unwound spar members causing the blade segments to twist and provide twist morphing relative to the spar members.

An aspect of an embodiment of the present invention provides, but not limited thereto, a method of manufacturing a rotor blade for a wind turbine. The method may comprise: providing a plurality of blade segments for use as part of a rotor; the plurality of blade segments may comprise an internal passage extending longitudinally from a first end to a second end of each of the blade segments; providing a plurality of spar members extending longitudinally through the internal passages of each of the blade segments such that the plurality of the spar members are aligned and in communication end-to-end through the internal passages and the plurality of blade segments are aligned and in communication the aligned spar members and define a complete rotor blade from a root that connects to a rotor hub to a blade tip of the rotor blade; providing a tension member extending longitudinally through the aligned spar members; and the aligned spar members are configured to at least partially unwind due to centrifugal forces exerted on the blade segments and aligned spar members, the unwound spar members causing the blade segments to twist and provide twist morphing relative to the spar member.

An aspect of an embodiment of the present invention provides, but not limited thereto, a rotor blade kit for forming rotor blade on a wind turbine. The kit may comprise: a plurality of blade segments for use as part of a rotor; the plurality of blade segments may comprise an internal passage extending longitudinally from a first end to a second end of each of the blade segments; a plurality of spar members for extending longitudinally through the internal passages of each of the blade segments such that the plurality of the spar members are aligned and in communication end-to-end through the internal passages and the plurality of blade segments are aligned and in communication the aligned spar members and define a complete rotor blade from a root that connects to a rotor hub to a blade tip of the rotor blade; a tension member for extending longitudinally through the aligned spar members; and the aligned spar members are configured to at least partially unwind due to centrifugal forces exerted on the blade segments and aligned spar members, the unwound spar members causing the blade segments to twist and provide twist morphing relative to the spar member.

An aspect of an embodiment of the present invention provides, but not limited thereto, an individual blade segment for a wind turbine that is formed from a plurality of the individual blade segments, whereby the individual blade segments may comprise an internal passage extending longitudinally from a first end to a second end of each of the blade segments; wherein a plurality of spar members extend longitudinally through the internal passages of each of the blade segments such that the plurality of the spar members are aligned and in communication end-to-end through the internal passages and the plurality of blade segments are aligned and in communication the aligned spar members and define a complete rotor blade from a root that connects to a rotor hub to a blade tip of the rotor blade; a tension member extends longitudinally through the aligned spar members; and wherein the aligned spar members are configured to at least partially unwind due to centrifugal forces exerted on the blade segments and aligned spar members, the unwound spar members causing the blade segments to twist and provide twist morphing relative to the spar members.

An aspect of an embodiment of the present invention provides, but not limited thereto, a rotor blade for a wind turbine. The blade may comprise: a plurality of blade segments for use as part of a rotor; the plurality of blade segments may comprise an internal passage extending longitudinally from a first end to a second end of each of the blade segments; a plurality of spar members extending longitudinally through the internal passages of each of the blade segments such that the plurality of the spar members are aligned and in communication end-to-end through the internal passages and the plurality of blade segments are aligned and in communication with the aligned spar members and define a complete rotor blade from a root that connects to a rotor hub to a blade tip of the rotor blade; and the aligned spar members and blade segments are configured to pivot due to centrifugal forces exerted on the blade segments and aligned spar members, the pivoted spar members and blade segments causing the blade segments to provide a curvature defining a deflection angle relative to the axis of rotation plane of the rotor blade.

An aspect of an embodiment of the present invention provides, but not limited thereto, a method of manufacturing a rotor blade for a wind turbine. The method may comprise: providing a plurality of blade segments for use as part of a rotor; the plurality of blade segments may comprise an internal passage extending longitudinally from a first end to a second end of each of the blade segments; providing a plurality of spar members extending longitudinally through the internal passages of each of the blade segments such that the plurality of the spar members are aligned and in communication end-to-end through the internal passages and the plurality of blade segments are aligned and in communication the aligned spar members and define a complete rotor blade from a root that connects to a rotor hub to a blade tip of the rotor blade; and the aligned spar members and blade segments are configured to pivot due to centrifugal forces exerted on the blade segments and aligned spar members, the pivoted spar members and blade segments causing the blade segments to provide a curvature defining a deflection angle relative to the axis of rotation plane of the rotor blade.

An aspect of an embodiment of the present invention provides, but not limited thereto, a rotor blade kit for forming rotor blade on a wind turbine. The kit may comprise: a plurality of blade segments for use as part of a rotor; the plurality of blade segments may comprise an internal passage extending longitudinally from a first end to a second end of each of the blade segments; a plurality of spar members for extending longitudinally through the internal passages of each of the blade segments such that the plurality of the spar members are aligned and in communication end-to-end through the internal passages and the plurality of blade segments are aligned and in communication the aligned spar members and define a complete rotor blade from a root that connects to a rotor hub to a blade tip of the rotor blade; and the aligned spar members and blade segments are configured to pivot due to centrifugal forces exerted on the blade segments and aligned spar members, the pivoted spar members and blade segments causing the blade segments to provide a curvature defining a deflection angle relative to the axis of rotation plane of the rotor blade.

An aspect of an embodiment of the present invention provides, but not limited thereto, an individual blade segment for a wind turbine that is formed from a plurality of the individual blade segments, whereby the individual blade segments comprise an internal passage extending longitudinally from a first end to a second end of each of the blade segments; wherein a plurality of spar members extend longitudinally through the internal passages of each of the blade segments such that the plurality of the spar members are aligned and in communication end-to-end through the internal passages and the plurality of blade segments are aligned and in communication the aligned spar members and define a complete rotor blade from a root that connects to a rotor hub to a blade tip of the rotor blade; and wherein the aligned spar members and blade segments are configured to pivot due to centrifugal forces exerted on the blade segments and aligned spar members, the pivoted spar members and blade segments causing the blade segments to provide a curvature defining a deflection angle relative to the axis of rotation plane of the rotor blade.

These and other objects, along with advantages and features of various aspects of embodiments of the invention disclosed herein, will be made more apparent from the description, drawings and claims that follow.

BRIEF DESCRIPTION OF THE DRAWINGS

The foregoing and other objects, features and advantages of the present invention, as well as the invention itself, will be more fully understood from the following description of preferred embodiments, when read together with the accompanying drawings.

FIG. 1A provides a perspective view of a modern conventional turbine.

FIG. 1B provides a schematic view of the associated net forces summed at quarter elements on a respective conventional blade of FIG. 1A.

FIG. 1C provides a perspective view of an aspect of an embodiment of the present invention downwind morphing wind turbine.

FIG. 1D provides a schematic view of the associated net forces summed at quarter elements on a respective blade of FIG. 1C.

FIG. 1E provides an illustration of palm tree in high winds.

FIG. 1F provides a schematic view of the associated net forces summed at quarter elements on two respective blades of FIG. 1C along with the deflection of curvature angles β and hub angle θ.

FIG. 2A provides a schematic view of the associated net forces on a respective conventional blade of FIG. 1A.

FIG. 2B provides a schematic view of the associated net forces on a respective blade of an embodiment of the present invention which demonstrates a free-coning blade so side-forces align with the blade.

FIG. 3A schematically illustrates the various forces acting on turbine blade(s) in general from the front view.

FIG. 3B schematically illustrates the various forces acting on turbine blade(s) in general from the side view.

FIG. 3C schematically illustrates the various forces acting on turbine blade(s) in general from the chord view.

DETAILED DESCRIPTION OF EXEMPLARY EMBODIMENTS OF THE INVENTION

Figure 4:
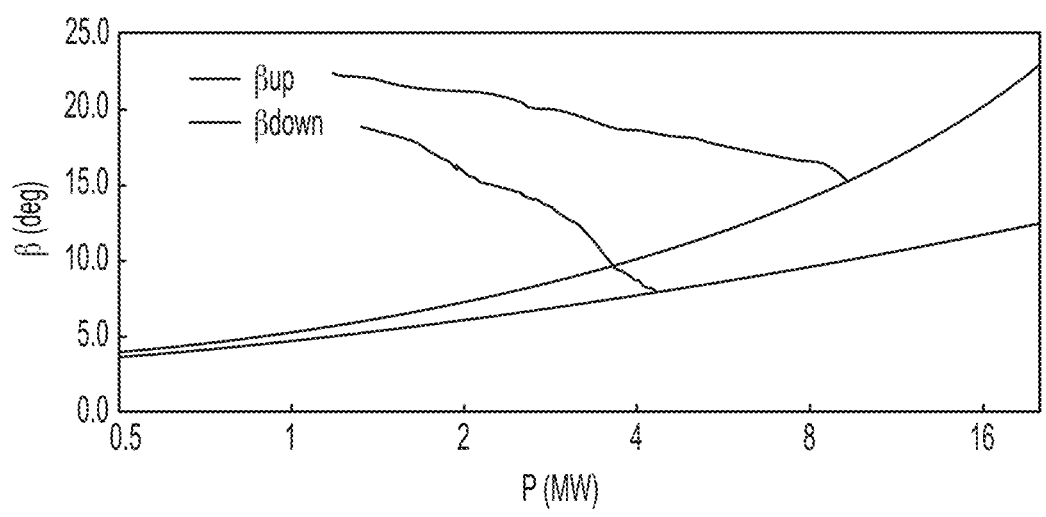
FIG. 4 provides a graphical representation of the average load-path angles (β) (i.e., deflection curvature angle with the axis of rotation plane of the blade) in degrees at rated conditions as a function of rated turbine power ($P_{rated}$) in MW.

The wind turbine 100 illustrated in FIG. 1A is a modern conventional turbine 100 that comprises a tower 104 supporting a nacelle 106. A substantially horizontal main shaft projects from the nacelle 106, a rotor 102 being mounted on the shaft, the rotor comprising a hub 108 and two or more blades 110. The rotor 102 can be made to rotate by the wind. In this example, the wind turbine is a so-called upwind turbine, where the wind impinges on the rotor 102 before it impinges on the tower 104, and where the nacelle 106 is able to yaw, i.e. rotate around a vertical axis with respect to the tower 104, the rotor thereby adjusting itself to the wind direction at any given moment. Moreover, the wind turbine is preferably provided with three blades 110 extending substantially radially outwards from the hub 108. Each blade 110 comprises a root section 116 near the hub 108 and a blade tip 114. Still referring to FIG. 1A, upwind turbine configurations typically employ blades with fiberglass shells (or more expensive carbon fiber) to carry the gravity, acceleration and aerodynamic loads. Designing the blades to be stiff enough to resist the forces at rated conditions (FIG. 1B) leads to the blade mass problems. As shown in FIG. 1B, the associated net forces summed at quarter elements and are schematically shown by force arrows 109 on a respective blade shown in FIG. 1A. The angle of the blade 110 is essentially aligned with the axis of rotation plane 132 of the blade. Load-adaptable blade geometry is not a new concept and in fact has been used on many successful (and unsuccessful) systems by introducing flexibility. An example load-adaptable geometry is the Soft Rotor concept [See Rasmussen, F., Petersen, J. T., Volund, P. Leconte, P, Szechenyi, E and Westergaard, C. "Soft rotor design for flexible turbines." in *Riso National Laboratory*. Roskilde, Denmark: Contract JOU3-CT95-0062, of which is hereby incorporated by reference herein in its entirety.], which employed flexible downwind blades that eliminated the need for mechanical yaw control. A two-bladed 15 kW (13 meter diameter) design was fabricated and field tested and it was found that the rotor loads were reduced by 25-50% during operation (compared to rigid upwind blades) while aerodynamic efficiency was approximately retained. Moreover, such a soft design can mitigate problematic high-frequency fatigue loads, a concept already demonstrated for tower design [See Sear, D., "Wind turbine technology: Fundamental concepts in wind turbine engineering," ASME 2009 (New York, N.Y.), of which is hereby incorporated by reference herein in its entirety.]. Other examples of adaptability to forces include coning designs, where typically two downstream blades are hinged at the hub. However, such systems are not widespread due to dynamics concerns with two-bladed designs, and structural designs for highly flexible blades.

The stiffness constraint can be relaxed if a downwind morphing concept is employed as per the aspects of the various embodiments of the present invention. An aspect of an embodiment of the present concept does not necessitate the use of a flexible rotor nor conventional coning, but instead as shown in FIG. 1C, employs a rotor 202 having three segmented blades with stiff elements whose joints can be unlocked at high-speeds to allow substantial downstream movement, i.e., downwind morphing. It should be appreciated that the present invention flexible rotor may employ two or more blade segments.

FIG. 1C provides a perspective view of an aspect of an embodiment of the present invention downwind morphing wind turbine 200 including among other things, a nacelle 206, a rotor 202 being mounted on the shaft, the rotor comprising a hub 208 and two or more segmented blades 210. Also shown is the deflection curvature angle β with the axis of rotation plane 232 of the blade. The rotor 202 is a downwind turbine from the tower 204 and nacelle 206 regarding the prevailing wind 203. Moreover, the wind turbine is preferably provided with three blades 210 extending substantially radially outwards from the hub 208. Each blade 210 comprises a root section 216 near the hub 208 and a blade tip 214. Although not specifically called out due to the limitations of the illustration, each blade is comprised of two or more blade segments (of which will be discussed in detail in this disclosure). Between each the segments (not specifically called out in FIG. 1C), the segments may be coupled with a hinge-like mechanism such as a ball joint, flex joint, pin joint, tension cabling, trunnion joint, or the like between them so as to be able to rotate or close downwind to provided downwind morphing.

Figure 13:
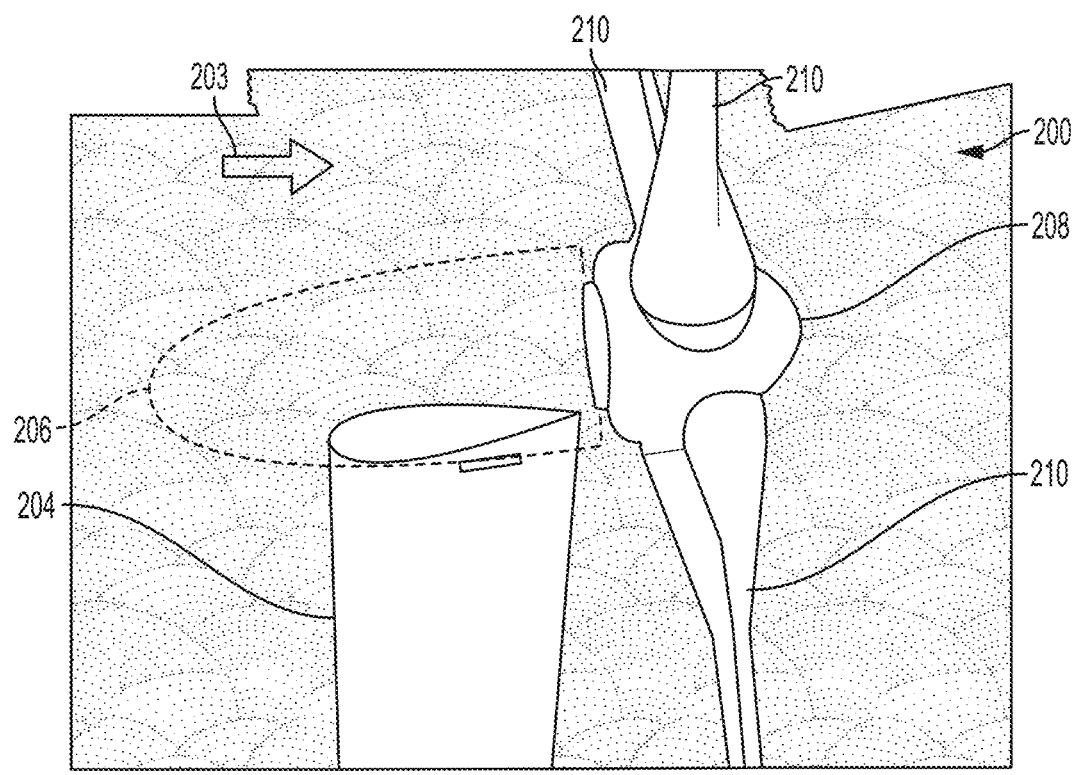
FIG. 13 Aerodynamic shroud around the tower for reduced tower wake effects on the blades, wherein for illustration purposes the nacelle is translucent (outlined with dashed lines) in context of the tower, hub and blades.

As can be seen in FIG. 1C, the tower 204 and the nacelle 206 may be provided with an aerodynamic design, such as an aerodynamic shroud for instance. Similarly, an enlarged view as shown in FIG. 13 will be discussed below.

As schematically shown in FIG. 1D, the associated net forces summed at quarter elements, which align along the blade 210 are schematically shown by force arrows 209 on a respective blade shown in FIG. 1C. The blade 210 has three blade segments 240 that may be joined at blade segment joints 241. Also shown is the deflection curvature of angle β with the axis of rotation plane 232 of the blade.

This concept has the advantage, but not limited thereto, in that it can still employ low-cost low-deflection fiberglass materials and furthermore, allows direct control of the degree of geometry change. At rated conditions, the joints are designed to eliminate any downstream moment so that gravity, centrifugal and aerodynamic loads only yield mass-efficient tensile loads (and avoid mass-consuming cantilever loads). The result is a dramatic reduction in structural stresses so that the blade mass may be dramatically reduced. As shown in FIG. 1E, this concept can be, for example, compared to the flow adaptability of the palm tree, whose light-weight segmented trunk can be considered as a series of cylindrical shells which can bend in the wind. FIG. 1E provides an illustration of palm tree in high winds. In contrast, the oak tree trunk is more like a solid (and much heavier) single-element beam which resists bending in moderate winds (like a conventional rotor). However, monsoon storms and hurricanes will blow and uproot most "stiff" trees away. In contrast, the segmented morphing palm tree can bend all the way to the ground and survives hurricane strength winds. This adaptability to aerodynamic load via an extremely lightweight structural design and thus, provides some of the principles of an embodiment of the present invention—Segmented Ultralight Morphing Rotor (SUMR).

Referring to FIG. 1F, the associated net forces summed at quarter elements, which align along the blade 210 are schematically shown by force arrows 209 on a respective blade shown in FIG. 1C. The blade 210 has three blade segments 240 that may be joined at blade segment joints 241. Also shown is the deflection of curvature angle β with the axis of rotation plane 232 of the blade. For a particular example, but not limited thereto, at rated conditions, the maximum deflection angles at the top and bottom blade positions reach values of 18° ($\beta_{up}$) and 12° ($\beta_{down}$), respectively. These angles are a primarily a function of blade weight, rotor rpm, and rotor power. In particular, the angles tend to increase as rotor power increases, especially for turbines which are greater than 1 MW of rated power. To avoid cyclic variations of blade angle of the blade 210 with respect to the rotating hub, i.e., axis rotation of the blade 232, teetering can be employed whereby the effective rotation hub axis (θ) is inclined downward at a net angle, e.g. θ=½ ($\beta_{up}-\beta_{down}$)=3°. This adaptability is quite beneficial since it removes gravity cycling stresses, and the associated reduction in dynamic loads and fatigue in the entire system also reduces cost and improves reliability. Teetering is most commonly used for two two-bladed systems, and various embodiments of the present invention morphing can be applied to one or more bladed turbines. In such cases, the rotor axis can also be changed by titling the rotor shaft with respect to the gravitational plane. This may be driven and controlled with motors or may be achieved using the downwind load forces to tilt the entire tower, e.g. for the case of a floating platform. It should be appreciated that the deflection of curvature angle β ($\beta_{up}$ and $\beta_{down}$) and hub angle θ may be designed to curve and align at any desired or required angle to achieve the intended or desired objective of turbine or rotor operation.

Furthermore, the downwind orientation may eliminate the need for mechanical yaw. Another key point of the morphing concept is aerodynamic fairing of the nacelle and tower (as shown in FIG. 1C), minimizing tower wake effects [See Loth, E., Selig, M. S., and Moriarty, P. "Morphing segmented wind turbine concept," in *AIAA Applied Aerodynamics Conference*. 2010. Chicago, Ill. AIAA-2010-4400 paper, of which is hereby incorporated by reference herein in its entirety.]. In addition, the segment pin-joints are designed to prevent deflection in the torque-wise direction since such moments (albeit small compared to the downstream cantilever moment for a conventional rotor blade) are needed for power extraction. Circumferential stiffness also allows conventional pitch control, e.g. so blades can be faired above rated wind speeds. The addition of joints results in a small but finite weight penalty, but allows morphing to be locally focused at the blade tips where aerodynamic and centrifugal forces are much higher than near the hub. In contrast, a coning rotor that cannot adapt along the blade will have reduced aerodynamic performance.

An aspect of the present invention pre-aligned rotor blade or downwind morphing rotor blade is that it provides, among other things, an aero-elastic design that reduces the downwind cantilever aerodynamic load to help reduce structural mass. Turning to FIG. 2, the distribution of forces at rated conditions for a conventional upwind rotor blade (FIG. 2A) and an embodiment of the present invention aligned downwind blade (FIG. 2B) and that demonstrates a free-coning blade so side-forces align with the blade, which eliminates downwind cantilever hub moments. This concept can be used for an embodiment of the present invention wind turbine to minimize rotor mass by avoiding the conventional stiffness constraint and instead adapting a downwind geometry to align with the load path, i.e., net force 109, 209 as shown in FIGS. 2A-2B. As shown in FIG. 2A, it can be seen that the conventional blade 110 that is subjected to the prevailing wind 103 has loading that leads to cantilever forces (i.e., net forces 109) in the downstream direction. In contrast, referring to FIG. 2B, an aspect of an embodiment of the present invention rotor having the aligned concept employs a geometry that orients the loads (i.e., net force 209) along the blade length of the blade 210 so that the structural loads primarily act in the tension mode. The blade 210, as shown, has four blade segments 240 that may be joined at blade segment joints 241 to be able to fold or close (partially or fully) downwind or may be fixed in "pre-aligned" or "aligned" fashion. The resulting load-path angles (β) (i.e., deflection of curvature angle with the axis of rotation of the blade) will vary as a function of radius and azimuthal angle, but these changes are minor. By converting loads to a tensile direction, this concept effectively uses design principles of cabled-stayed bridges and the kite rotors to reduce mass by minimizing cantilever-based shear loads. However, the present downwind rotor design (for example, as shown in FIG. 2B) is unique in that it can avoid direct use of cables to direct loads in the tensile direction, and instead incorporates aeroelastic adaptability bio-inspired by the palm tree. If this alignment is fixed (independent of wind speed) and based on eliminating cantilever loads at the rated condition (where peak loads occur), it is termed herein as a "pre-aligned" or "aligned" rotor. Note that an embodiment of the pre-aligned rotor (or "aligned" rotor) present invention provides, among other things, a design that is fixed in advanced. In contrast, an embodiment of the morphing rotor of the present invention is as a function of wind speed. It should be appreciated that a morphing rotor can achieve the positions achieved by pre-aligned (aligned) rotor by implementing the appropriate coupling, materials, and structure as desired or required as is contemplated within the context of the present invention. And vice versa, whereby it should be appreciated that a pre-aligned rotor can achieve the positions achieved by a morphing rotor by implementing the appropriate design criteria as discussed herein.

To determine the typical angles needed to align a rotor blade with the rated load conditions, an aspect of an embodiment of the present invention considers a decomposition of the forces which act on a turbine blade in general as shown in FIG. 3. These forces include the gravity force (G), the centrifugal force (C), the downstream aerodynamic thrust force (T), and the in-plane aerodynamic torque-wise force ($F_Q$). Note that the latter two forces result from the aerodynamic drag force (D) and the lift force (L). FIGS. 3A, 3B, and 3C schematically illustrate the various forces acting on the turbine blades in general from the front view, side view and chord view, respectively.

An aspect of an embodiment of the present invention entails the estimation of the net load-path angle (β) (i.e., deflection curvature angle with the axis of rotation plane of the blade) in terms of these net forces and the azimuthal blade angle (φ, defined as 0 for a blade that is pointed vertically upwards and π for a blade that is downwards) as:

$$\beta = \tan^{-1}\left(\frac{T}{C - G\cos\varphi}\right) \quad (1)$$

This load-path angle is shown in FIG. 4 for the blade pointed upwards ($\beta_{up}$, where $\varphi=0$) and downwards ($\beta_{down}$, where $\varphi=\pi=\pi$) as a function of turbine rated power. For moderate-size turbines (less than 1 MW), the load-path angle at rated conditions is small (typically less than 5 deg.) so that some of this can be accommodated by aeroelastic deflection for an upwind conventional rotor. This indicates that aligned blades do not benefit small systems. However, for large- and extreme-scale turbines the load-path angles can be large, e.g. more than 20 degrees for a 20 MW system. This trend of increasing $\beta$ with increasing P is a result of size-scaling for a constant tip-speed ($\omega \sim R^{-1}$) such that $C \sim R^{1.2}$ (Eqs. 2 and 5), $T \sim R^2$ (Eqs. 1, 6 and 13), while $G \sim R^{2.2}$ (Eqs. 2 and 4).

Since cantilever loads are more significant at extreme-scales, alignment allows a larger reduction in the moments experienced by the blade (per FIG. 2). Furthermore, aligning the blade geometry at these large angles downstream necessitates a downwind rotor. Thus, scaling will drive extreme-scale systems to downwind aligned rotors. One may also note that there is a significant difference in the upwards and downwards load-path angles in FIG. 4, which is due to the increased importance of gravity loads at extreme-scales. Additional differences in these load path angles can occur if there is a vertical wind-shear across the rotor causing higher wind speeds at higher altitudes. To avoid cyclic appearance of cantilever loads while maintaining a fixed rotor geometry with respect to the hub, the hub axis can be tilted relative to the horizon as a function of wind speed by $\theta$ as shown in FIG. 1F. If a two-bladed design is used, this tilting can instead be achieved by tilting the hub-axis or by teetering the rotor. For two- or three-bladed designs, individual pitch control and/or trailing edge surfaces (flaps or tabs) may accommodate tilt-pitch coupling as well as rapid changes in wind angle or speed caused by gusts. It should be noted that rotor speeds above rated conditions will result in only a small reduction in the load path angles, such that pre-alignment at rated conditions will be nearly ideal. For rotor speeds below rated conditions, the load path angles will generally not be aligned with those at rated conditions, but at these lower speeds the loads on the blades are substantially reduced so that the adaption is not needed to avoid peak stresses on the blades.

Figure 5D:
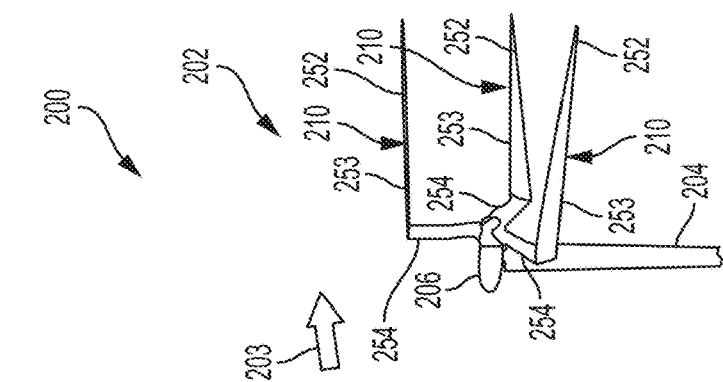
FIG. 5D schematically illustrates an exemplary downwind morphing schedule as a function of wind speed for stowed configuration.
Figure 5C:
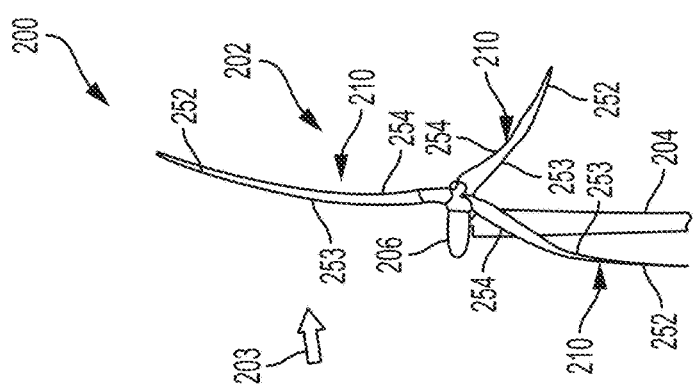
FIG. 5C schematically illustrates an exemplary downwind morphing schedule as a function of wind speed for full downwind morphing.
Figure 5B:
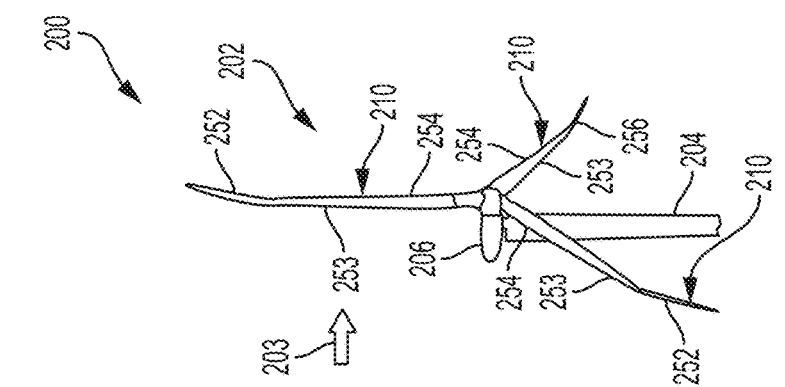
FIG. 5B schematically illustrates an exemplary downwind morphing schedule as a function of wind speed for partial downwind morphing.
Figure 5A:
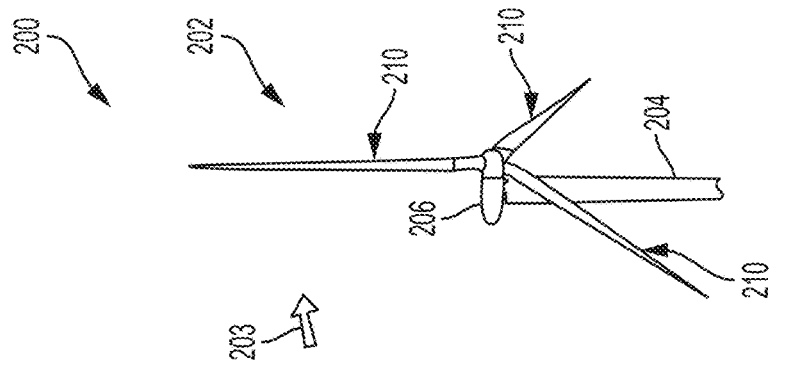
FIG. 5A schematically illustrates an exemplary downwind morphing schedule as a function of wind speed for no morphing.

A qualitative downwind morphing schedule is shown in FIGS. 5A-D for an aspect of an embodiment of the present invention morphing wind turbine 200 including among other things, a nacelle 206, a rotor 202, hub 208, blades 210, and tower 204 while exposed to a given prevailing wind 203. Referring to FIG. 5A, for parked conditions and low-wind speeds, the turbine blades 210 are un-morphed since the stresses are generally small and dominated by gravity loads. For example, there is no morphing at the range for about 0-8 m/s. Although not specifically called out, all of the blade segments 240 are generally shown substantially in the same plane. At low wind speeds below the cut-in wind speed, the rotor will be in a parked state where the rotor is perfectly vertical). As the wind speed increases above the cut-in speed, the rotor will start to turn and produce power. Referring to FIG. 5B, as the wind speed increases further, centrifugal and aerodynamic loads can dominate gravity loads such that the load path does vary strongly with azimuthal angle. Once a segment has reached a loading level that leads to a moderate downstream deflection angle (e.g. 18° or less), the joints (starting first with the outermost joint) are sequentially are unlocked so the segment is free to deflect downstream. The initial downwind morphing will have the outermost blade segment 252 angled compared to both the middle blade segment 253 and inner blade segment 254, which remain substantially in the same plane. As the wind speed increases more and more of the segments will be free to align. Referring to FIG. 2C, at rated conditions, all jointed segments of the blade are aligned so the rotor is fully morphed to minimize the stresses induced by the high aerodynamic and centrifugal loads. The most outer blade segment 252, middle blade segment 253, and inner blade segment 254 are all angled relative to one another. As the wind speeds increases above rated conditions but are below the cut-out conditions, the rotor will remain fully morphed. For example, full morphing occurs at the range for 14-28 m/s. Referring to FIG. 5D, the segmentation can also be used to "stow" the rotor blades in very high wind-speeds, which occur when hurricane-strength storms are possible. For example, stowed configuration for wind speeds above 28 m/s (nearing Category 1 Hurricane speeds). The most outer blade segment 252 and middle blade segment 253 are angled and in a common plane compared to the inner blade segment 254. It should be appreciated that the angles of the blade segments and the curvature of the blade segments themselves be designed to align and curve at any desired or required angle or curvature to achieve the intended or desired objective of turbine or rotor operation.

It should be appreciated that any of the structures, devices or components discussed herein may be controlled by a controller and/or appropriate motors or power source.

Figure 6:
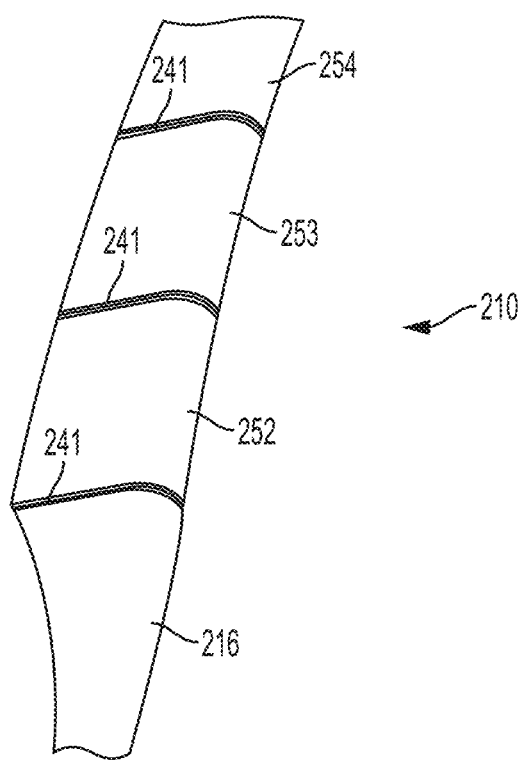
FIG. 6 schematically illustrates the blade segments joined or coupled as desired or required.

FIG. 6 provides an enlarged partial perspective view of a blade 201 having multiple blade segments 252, 253, 254. In an embodiment, the blade segments are coupled, in communication, or joined at their respect joints 241. The coupling may be accomplished by a joint such as a trunnion, hinge, pin joint, ball joint, flex joint, or cable. In addition, the hinge effect may be accomplished by material selection or structural design. Additionally, the coupling may be accomplished by a pivot mechanism, device or system. Moreover, the coupling may be accomplished by an elastomeric material or other suitable coupling, adhesive, connecting, or joining approaches that are available. The blade segmentation aspect can be especially transformative with respect to, but not limited thereto, manufacturing, transporting, and repairing such systems. This modularity, coupled with the reduced overall system weight can break down barriers inherent to increasing the scale of current turbine designs. The outer blade segment 252 may or may not include the blade tip 216. Similarly, the inner blade segment 254 may or may not include the root section (not shown).

It should be appreciated that any of the segments may be released at a variety of speeds, increments, or sequence. The release may be attributed to, for example, a variety of forces, cables, couplings and controllers.

The various embodiments of the present invention may be applicable to a variety of turbine sizes such as being larger than, equal to, or smaller than the following ranges: a) 0.10 MW, 18 m D, 9 m blade; b) 0.75 MW, 50 m D, 25 m blade; c) 1.5 MW, 66 m D, 33 m blade; d) 2.5 MW, 85 m D, 42.5 m blade; e) 3.5 MW, 100 m D, 50 m blade; f) 5 MW, 120 m D, 60 m blade; and g) 20 MW, 240 m D, 120 m blade. It may be noted that while the twist morphing could be used at all speeds it may not provide the mass savings as would be the case associated with the downwind morphing or pre-aligned embodiments. It may be noted that the downwind morphing embodiment or pre-aligned embodiment will most likely be used for turbine size of approximately 1 MW or greater due to the associated mass savings.

Next, regarding downward morphing, a joint member 241 may be provided with the appropriate joint or pivot (such as trunnion, hinge, pin joint, ball joint, flex joint, or cable) as desired or required the blade segments can altered to provide for downwind morphing. It should be appreciated that the spar member of a blade may have a rectangular or other polygon cross-section shape rather than circular, oval or rounded shape. The blades and spars and their related components may utilize the devices and methods of manufacturing disclosed in the references A through FF listed herein. The rotors, hubs, controllers, motors and other related components of the wind turbine may be implemented utilizing the devices and methods of manufacturing disclosed in references A through FF listed herein. The hinges between blade segments may be implemented utilizing the devices and methods of manufacturing disclosed in the references A through FF listed herein, such as those used for the approaches for coning, folding or collapsing blades. The components, structures and devices of the wind turbine disclosed herein may be implemented utilizing the materials specified in references A through FF listed herein.

Figure 7:
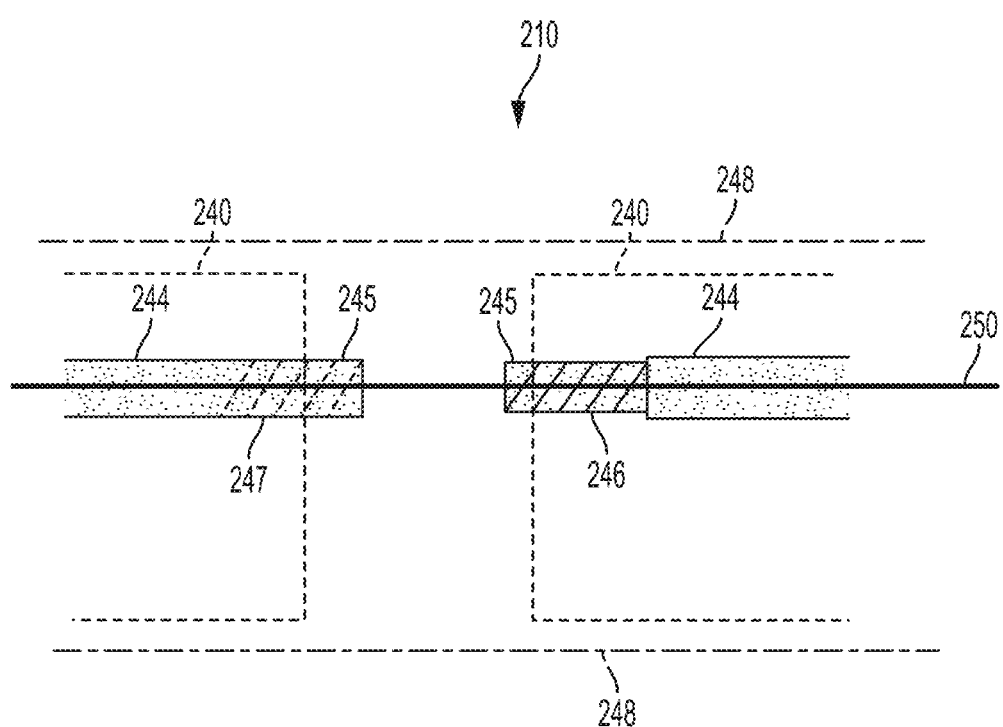
FIG. 7 schematically shows an exploded view of the alignment of adjacent blade segments for a twist morphing embodiment.

For twist morphing, referring to FIG. 7, to achieve this blade segmentation and adaptability of the various embodiments of the present invention a fundamentally new structural design is required. In particular, an aspect of an embodiment of the present invention provides spar members 244 within the blade segments 240 (near the quarter-chord line or other chord line location as desired or required to intend blade and rotor design) that can be socketed together with a desired coupling member 245, such as but not limited thereto, threaded joints 244, 246. Also shown is a skin 248 that at least covers the blade segments of the blade 210. A coupling member or device 245 (such as threaded spar joints 244, 246) may be designed to have nearly zero friction (e.g. housed in a hydraulic joint) and the blade segments 240 are held together by a tension member 250 (such as a cable or the like) as shown in FIG. 7. The spar members 244 may have a circular cross-section or other geometric configurations that is suitable or desirable for operation. Coupling members 245 are providing for joining or interfacing the spar members 244 together or in communication with each other, and may be any coupling device, mechanism, or approach. As illustrated in FIG. 7, the coupling member 245 is an internal threaded joint 246 and external threaded joint 247. The threaded joints of the spar members 244 may be any coupling device, mechanism, or approach. The tension cable 250 can run, for example, from the blade tip 214 to the rotor hub 208 (tip and hub shown in FIG. 1C for example) where it can be attached by a spring and dash-pot damper system (dash-pots may also be placed at the joints). A hub cam can be used to provide eccentricity so that the cable tension remains constant despite changing gravitational loads as the blades move from the up to down positions. The dashpot is a mechanical device, a damper which resists motion via viscous friction. The resulting force is proportional to the velocity, but acts in the opposite direction, slowing the motion and absorbing energy. Dashpot can be used in conjunction with a spring (which acts to resist displacement). It should be appreciated that other available motion resistant or dampening systems and mechanisms may be utilized as desired or required.

Figure 8A:
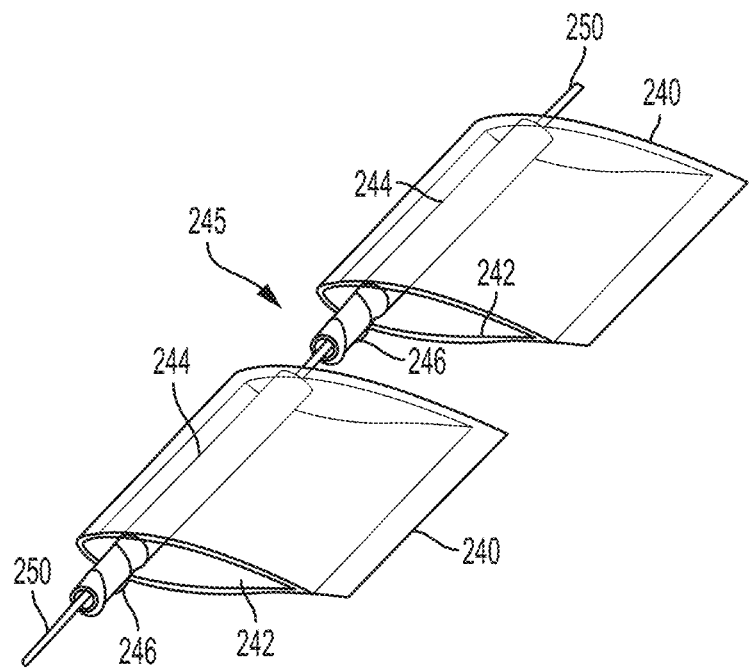
FIG. 8A schematically shows a perspective view of the alignment of adjacent blade segments for a twist morphing embodiment.
Figure 8B:
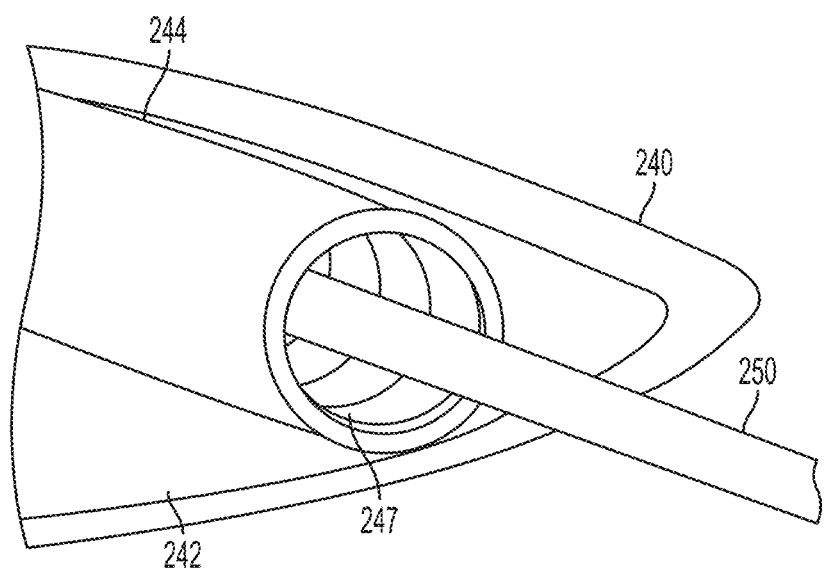
FIG. 8B schematically shows a perspective partial view of the alignment of adjacent blade segments shown in FIG. 8A.

For twist morphing, FIG. 8A provides a perspective view of the two blade segments 240 and associated components and FIG. 8B provides an enlarged partial perspective view of a blade segment of FIG. 8A. FIG. 8A provides two blade segments 240 that may be utilized as part of a rotor blade for a rotor of wind turbine. The blade segments may include an internal passage 242 extending longitudinally from a first end to a second end of each of said blade segments. Spar members 244 extend longitudinally (i.e., span wise) through said internal passages of each of said blade segments such that the plurality of the spar members may be aligned and in communication end-to-end (i.e., span wise) through said internal passages. Additionally, the blade segments 240 are aligned and in communication with spar members 244 to form a rotor blade. The spar members 244 may be joined by a coupling or connecting mechanism, system or device 245 such as a threaded joint. The external portion 246 of the threaded joint of the spar member 244 is shown in FIG. 8A and the internal portion 247 of the threaded joint of the spar member 244 is shown in FIG. 8B. A tension member 250 is provided that extends longitudinally through said aligned spar members 244. The aligned spar members are configured to be free to twist and at least partially unwind due to centrifugal forces exerted on the blade segments and the aligned spar members. As a result, the free or unwound spar members will cause the blade segments to twist and provide a twist type morphing. It should be appreciated that the twisted blade segments can be designed to align and curve at any desired or required angle or curvature to achieve the intended or desired objective of turbine or rotor operation. The tension member comprises at least one of the following: cable, rod, chain, rope, etc. or other available elongated member. It should be appreciated that the spar members may run along inside the blade segments at any desired or required location. Similarly, the span members may run as part of the wall of the blade segment itself, or even outside the wall of the blade segment.

Moreover, for twist morphing, one or more curvature coupling mechanisms 245 of the spar and/or blade segments joints 241 may be provided with the appropriate joint or pivot (such as trunnion, hinge, pin joint, ball joint, flex joint, or cable) as desired or required the blade segments can altered to provide for twist morphing.

For twist morphing, it should be appreciated that the spar member may have a rectangular or other polygon shape rather than circular, oval or rounded shape.

Figure 9A:
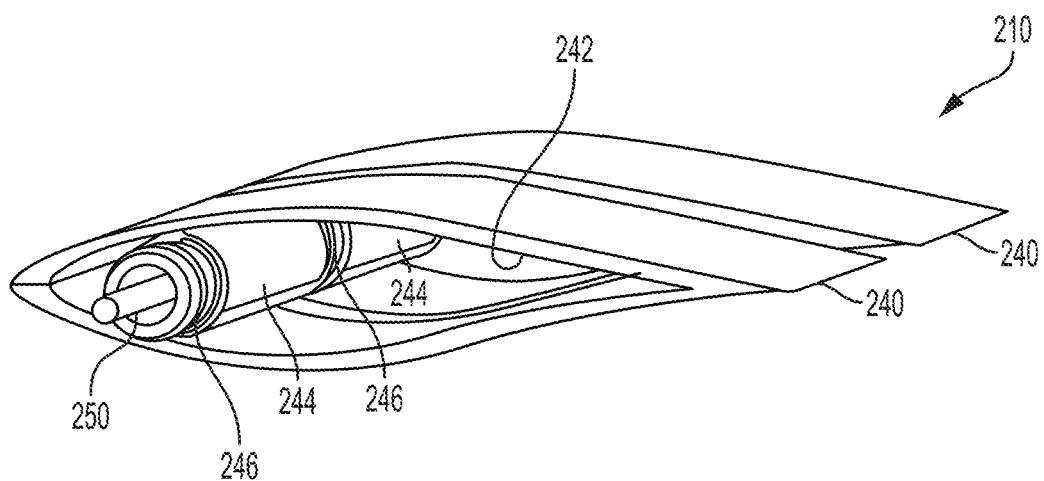
FIG. 9A schematically shows a perspective view of the alignment of adjacent blade segments in a fully-wound (together) condition for a twist morphing embodiment.
Figure 9B:
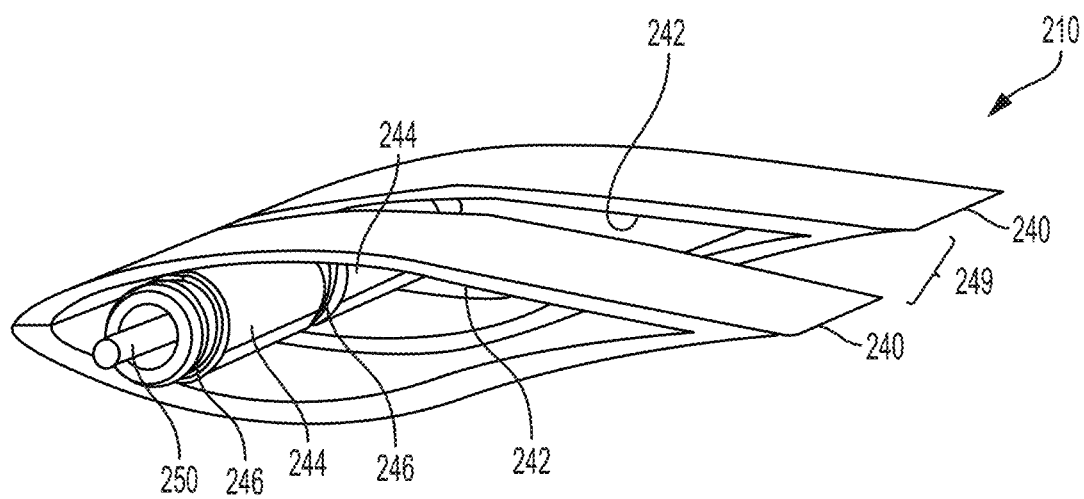
FIG. 9B schematically shows a perspective view of the alignment of adjacent blade segments in an unwound (separated) condition for a twist morphing embodiment.

For twist morphing, FIG. 9 provides a perspective view of a portion of a blade 210 illustrating blade segments 240, spar members 244, spar joints or sockets (revealing the external threaded joints 246 in the illustration), and tension member 250. At wind speeds below the rated wind speed, this cable tension may be set so that the spar members 246 are "fully threaded" and the blade segments are together (See FIG. 9A). The fully-threaded position will be associated with the maximum geometric twist of the blade from the plane of rotation, to give a reasonable angle of attack for low winds. At wind speed increases beyond the rated speed, the rotor tip speed will also increase but a constant power is desired to match the generator capability. The tension can be set so that the increased rpm will result in centrifugal forces which will cause the spar members 244 and blade segments 240 to pull apart and thus the spar members 244 will unwind to reduce the effective angle of attack and maintain constant power (see FIG. 9B). FIG. 6B illustrates the unwound condition for high speeds, for example. The blade segmentation will lead to small structural gaps 249, but these can be covered with an elastomeric sheath (not shown in FIG. 9) to aerodynamically cover the gap 249 extension resulting from any amount of unwinding. This feathering will tend the blade toward an optimum pitch to prevent stall and the associated unsteady torques. This control is similar to that used in a Jacob turbine whereby centrifugal forces change pitch (by overcoming spring tension) to avoid over-speed. Note that the Jacob's concept ensured that all three blades changed pitch simultaneously. While an aspect of an embodiment of the present invention does not require this same consistency mechanically, and the addition of fine-scale pitch control (e.g. with fast-acting tabs near the trailing edge of the airfoil) may be sufficient to keep aerodynamic balance for extreme-scale systems. The threading angle at each joint can be uniquely designed to achieve optimum twist changes over the most outboard (power cable producing) blade span at each wind-speed (which is associated with a unique quasi-steady turbine rpm).

Segmenting allows much higher effective twist control than single-element concepts since small angles between segments can lead to large overall twist. This is desirable since the optimal pitch angle can vary by as much as 20 deg. above the rated wind speed [See Wilson "Wind Turbine Aerodynamics, Part A Basic Principles" in "Wind Turbine Technology," edited by Spera, D. A., ASME Press, New York, N.Y., 2009, the disclosure of which is hereby incorporated by reference herein]. This quasi-steady speed-tailored feathering can reduce the need for dynamic pitch control (which may help reduce overall system mass and thus cost) though full-span pitch control and system braking can be provided to prevent over-speed above the set maximum blade rotation rate.

EXAMPLES

Practice of an aspect of an embodiment (or embodiments) of the invention will be still more fully understood from the following examples and experimental results, which are presented herein for illustration only and should not be construed as limiting the invention in any way.

Example Set No. 1

To demonstrate reduction of structural stresses and blade mass, finite element analysis (FEA) has been conducted by the Applicants at rated power conditions for conventional vs. segmented morphing rotors. The simulated rotors employed a fiberglass shell with the aerodynamic mold lines (including airfoil shape, size, and twist as a function of rotor radius) of the NREL 5 MW reference turbine blade, but scaled (See Jonkman, J., Butterfield, S., Musial, W., Scott, G., "Definition of a 5-MW reference wind turbine for offshore system development," NREL Technical Publishing, 2009 (NREL/TP-500-38060, of which is hereby incorporated by reference herein in its entirety.) to a 10 MW system. The surface discretizations are shown in FIGS. 7A and 7B. The downwind morphed geometry was determined based on a zero net moment in the downstream direction but retained the finite torque-wise (power-producing) moment about the hub axis.

Figure 10A:
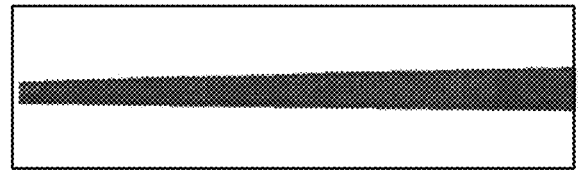
FIG. 10A provides a finite element analysis (FEA) of downwind morphing rotor blades at rated conditions for a 10 MW turbine showing surface meshes for conventional blades.
Figure 10B:
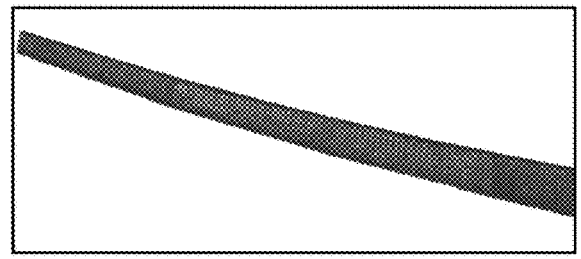
FIG. 10B provides a finite element analysis (FEA) of downwind morphing rotor blades at rated conditions for a 10 MW turbine showing surface meshes for morphed blades.
Figure 10C:
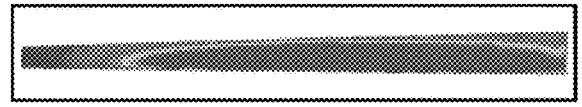
FIG. 10C shows von Mises stress for a conventional blade according to the stress color map in MPa provided in FIG. 10F.
Figure 10D:
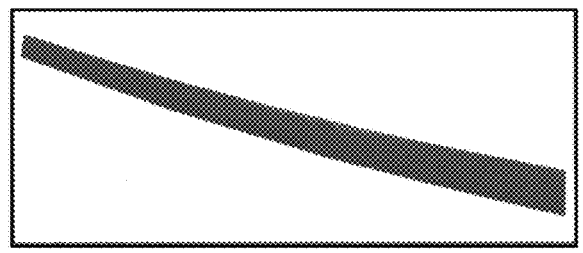
FIG. 10D shows von Mises stress for a morphed blade with the same mass according to the stress color map in MPa provided in FIG. 10F.
Figure 10E:
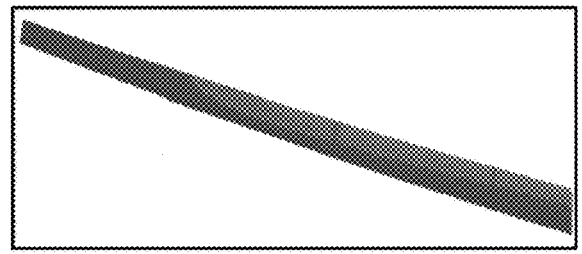
FIG. 10E shows von Mises stress for a morphed blade with 50% less mass according to the stress color map in MPa provided in FIG. 10F.
Figure 10F:
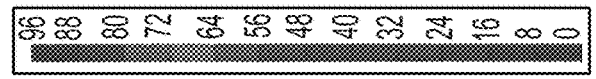
FIG. 10F shows the stress color map in MPa.

The von Mises stresses for the conventional and downwind morphed blade at rated conditions are shown in FIG. 10C and FIGS. 10D through 10E for vertical upwards position (where morphing is largest). When blade mass is fixed, the stresses are reduced by more than 85% (with similar reductions for horizontal and vertical downward positions). This is because the combination of gravity, centrifugal and aerodynamic loads are all directed in an efficient tensile path (FIG. 10D) and since the remaining out-of-plane torque-wise loads arc less than 4% in comparison. In contrast, the conventional rotor blade must carry these loads in a cantilever mode (FIG. 10C) which induces substantial shear stresses. Even when the downwind morphing blade mass is reduced by 50%, the stresses are still below those for a conventional rotor. It is noteworthy that the rotor mass savings increases with size. Since tower mass depends to some degree on rotor mass, this shows that the SUMR concept can substantially decrease system mass, while increasing power capture.

Example Set No. 2

Transformational Cost Reduction

The various aspects of embodiments of the present invention SUMR design directly addresses, among other things, cost of energy (COE) reduction goals for offshore or land wind turbines in a number of ways. The morphing rotor design of various embodiments of the present invention significantly reduces both of the rotor and overall turbine fatigue and extreme loads, allowing a significant mass and cost reduction both in the rotor itself and in the balance of the turbine's overall load path. The reduction in loads and tower head mass allows the reduction of mass and cost for the turbine tower and foundation system as well.

Referring to Tables, 1, 2 and 3, to illustrate the potential COE reductions possible with a next generation offshore wind turbine based on the SUMR turbine, the proposed configuration has been compared to a baseline turbine design using the NREL Wind Turbine Design Cost and Scaling Model, see Table 1. The NREL model defines a PMDD 10 MW offshore turbine reference configuration, which was selected as the baseline configuration. For offshore applications the model assumes an annual average wind resource of 9.16 m/s at 50 m above water level, yielding 10 m/s at the selected hub height. The complete model is available for detailed review, with key output results included in this section. An advanced configuration was then defined based on SUMR, in conjunction with a permanent magnet, direct drive (PMDD) drivetrain topology based on Northern Power's current 2.3 MW onshore turbines. The SUMR design enables a significant increase in the rotor diameter and swept area, while still allowing a significant reduction in mass and cost for the overall wind turbine.

TABLE 1

Description Operating Parameters for the Turbine & Wind Operating Parameter Inputs

| | Offshore 10.0 MW Baseline (PMDD) | Proposed Turbine |
|---|---|---|
| Land Based or Offshore? | Offshore | Offshore |
| Machine Rating (kWs) | 10000 | 10000 |
| Rotor Diameter (meters) | 175 | 206 |
| Hub Height (meters) | 120 | 120 |
| Wind Speed @ Hub Height | 10 | 10 |
| Weibul KFactor | 2 | 2 |
| Wind Shear | 0.1 | 0.1 |
| Max Rotor Op | 0.482 | 0.482 |
| Max Tip Speed m/s | 80 | 80 |
| Max Tip Speed Ratio | 8 | 8 |
| Wind Farm Size in MWs | 250 | 250 |
| Total Non-Drivetrain Losses | 10% | 10% |
| Availability | 95% | 96% |
| Drive Train Design | PMDD | PMDD |

As compared to the baseline configuration, the SUMR turbine offers, see Table 2:

Increased rotor swept area by 38% (since larger rotor is possible due to reduced mass), leading to increased energy capture of 13%.

Reduced rotor and load path mass and cost, leading to lower turbine capital cost.

Reduced tower and foundation mass and cost, leading to lower turbine and balance of system cost.

Reduced transportation costs due to segmentation.

TABLE 2

Annual Energy Wind Farm Production Survey

| Representative Categories | Offshore 10.0 MW Baseline (PMDD) | Proposed Turbine | Improvement |
|---|---|---|---|
| Total Installed Capacity (kW) | 250,000 | 250,000 | |
| AEPtot (MWh/yr) | 1,188,499 | 1,329,053 | 12% |
| EL (total losses %) | 10% | 10% | |
| Availability (%) | 95% | 96% | 1% |
| AEPnet (MWh/yr) | 1,016,167 | 1,148,302 | 13% |
| Capacity Factor | 46.40% | 52.43% | 13% |

TABLE 3

Wind Energy Systems COE Summary

| Representative Categories | Offshore 10.0 MW Baseline (PMDD) | Proposed Turbine | Improvement |
|---|---|---|---|
| Turbine Capital Cost ($/kWh) | $0.037 | $0.030 | 21% |
| Balance of System Cost ($/kWh) | $0.075 | $0.052 | 30% |
| Operations & Maint. Cost ($/kWh) | $0.018 | $0.014 | 24% |
| Levelized Replcmt. Cost ($/kWh) | $0.003 | $0.002 | 21% |
| Total System ($/kWh) | $0.133 | $0.098 | 27% |

The proposed turbine is focused on the SUMR configuration to isolate the improvements directly attributable to this innovative concept. Further COE reductions may result by combining other advanced rotor and balance of turbine improvements with SUMR. For example, Northern Power is extending its highly modular PMDD drivetrain technology to large offshore wind turbines, which will further increase energy capture and reduce O&M and LRC costs with respect to the baseline turbine configuration. The combination of these achievable improvements will meet and exceed DOE's goals of COE of below 10 cents per kWh by 2020, and potentially pave the path to DOE's goal of COE below 7 cent per kWh by 2030.

These cost saving are realized because morphing reduces rotor mass and segmentation and modularity simplifies fabrication, transportation, assembly, and maintenance. This allows a COE reduction of as much as 27% as compared to a conventional wind turbine. Such cost savings can break down the barriers inherent to extreme-scale off-shore wind turbines, but their realization requires detailed design, experimental field demonstration as well as detailed cost and commercial viability analysis, as is proposed herein.

Example Set No. 3

Finite Element Analysis for Fixed-Mass Aligned Blade

Figures 11A, 11B:
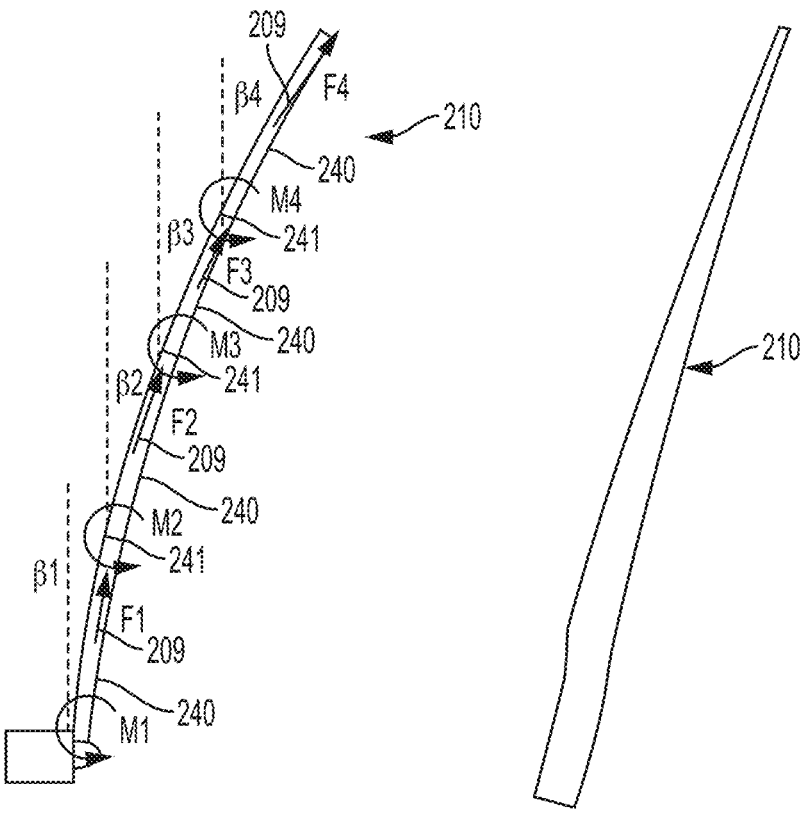
FIG. 11A schematically shows downwind morphing method to ensure zero moment nodes.
FIG. 11B schematically shows downwind morphing resulting downstream blade curvature.
Figure 12:
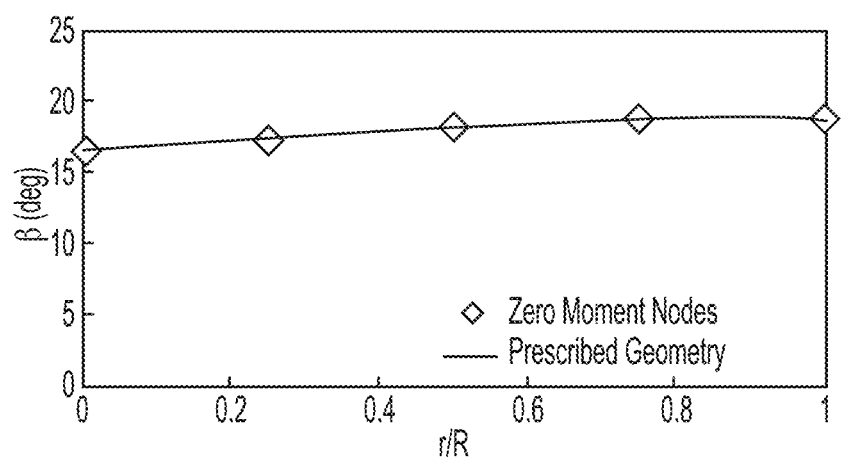
FIG. 12 provides a graphical representation of the downwind morphing deflection angle at each node and the resulting fit vs. the radial position for fixed-mass and fixed-length.

To determine the stresses expected on a fixed-mass aligned downstream blade, a 10 MW aligned blade was created. The mass, thickness, and geometry were held constant and the same aerodynamic forces were applied as used for the conventional 10 MW blade. The only difference was that the aligned blade included downstream curvature. In order to determine the alignment angles, the blade 210 was segmented into four sections. For each segment 240, the total aerodynamic, centrifugal, and gravitational forces were calculated and assumed to act at the center of each section. Using the force values 209 ("F"), the angle β at each joint 241 was set so that the net downstream moment ("M") at the node points was zero, as shown in FIG. 11A. Once the necessary angles for each of the four joints were found, the geometry was created to match each joint angle. The resulting shape and computational mesh, representing the blade 210, are shown in FIG. 11B, where it can be seen that the blade geometry can be approximately represented as downwind coned. The detailed deflection angle is shown in FIG. 12, where a range from 16-19 deg over the blade radius can be observed.

FEA was then used in order to determine the stresses in the aligned blade. A mesh of 14,997 shell elements was created in ANSYS again with a maximum element size of 0.5 m (FIG. 11B). Applying the aerodynamic, centrifugal, and gravitational forces using the same method as for the conventional blade, the Von Mises stresses shown in FIG. 12 were calculated. The peak Von Mises stress found was 19 MPa (an 82% stress reduction compared with conventional) and the average stress was 9 MPa (an 85% stress reduction compared with conventional). This demonstrates the substantial benefit of alignment in reducing stresses, and thus stiffness requirements on the blade. It should be noted that the swept area has been reduced by 9% for this case since blade length was kept fixed.

Example Set No. 4

Segmentation and Shadow Effects

A concern about using a downwind rotor may be the wake effects of the tower on the blade. These can be problematic as they induce unsteadiness in blade loading that can lead to blade fatigue. However, they can be mitigated in two ways. Firstly, the tower can be aerodynamically faired as shown in FIG. 13. This can have a substantial impact since the drag (and wake of an airfoil) can be many times less than that of a cylinder.

Figure 14:
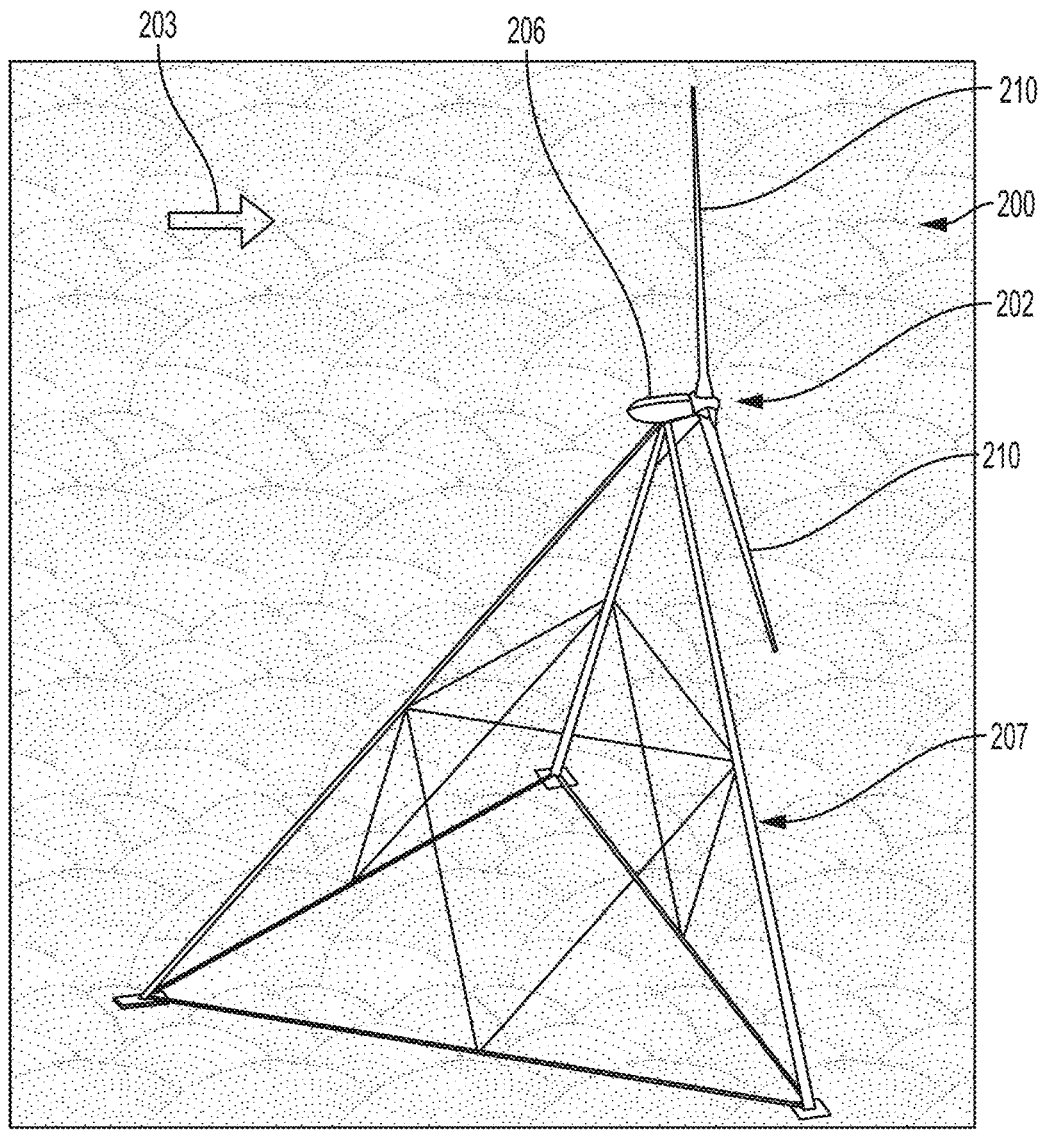
FIG. 14 schematically shows a perspective view of Tripod floating embodiment of the present invention (pre-alignment aspects or morphing not shown).

The shroud can be set to externally rotate around a fixed cylindrical structure. The shroud rotation can be passive by allowing aerodynamic forces to align in the proper downstream direction. Since the wake effects are strongest near the outer portion of the blade (where most of the torque and downwind loading occurs), the aerodynamic shrouding may only be required for the section of the tower that are just upstream of the outer blade passage. Furthermore, the geometric downwind curvature also helps alleviate the tower shadow wake effects since the blade tips (where the effect can be most problematic) are shifted far downstream of the tower from pre-alignment. Active yaw control requirements may also be significantly reduced as a result of this downwind design[12]. For very deep waters (>60 m), a downwind rotor could also allow for a floating tripod system 207 as shown in FIG. 14. The upstream floating pod could be cabled below to the sea floor so the thrust force aligns the turbine to the wind (self-yawing). Such a tripod platform (vs. a single column tower) may also help reduce wake effects since the increased stiffness associated with a broader platform allows smaller elements. This could also reduce tower mass since columnar designs at large scales can become costly and large.

The following patents, applications and publications as listed below and throughout this document are hereby incorporated by reference in their entirety herein. The devices, systems, compositions, computer program products, non-transitory computer readable storage medium, and methods of various embodiments of the invention disclosed herein may utilize aspects disclosed in the following references, applications, publications and patents and which are hereby incorporated by reference herein in their entirety:

A. Ashwill, T. D., "Materials and Innovations for Large Blade Structures: Research Opportunities in Wind Energy Technology," AIAA/ASME/ASCE/AHS, ASC Structures, Structural Dynamics, and Materials Conference, AIAA Paper 2009-2407, 2009.

B. Fingersh, L. J., Hand, M., and Laxson, A., *Wind Turbine Design Cost and Scaling Model*, Golden, Colo.: NREL Technical Publishing, NREL/TR-500-40566, 2006.

C. Gipe, P. 2004 *Wind power: Renewable Energy for Home, farm and business* Chlesea Green Publishing Company, VT.

D. Gopalarathnam, A. and Selig, M. S., "A Design Methodology for Low-Speed Natural Laminar Flow Airfoils," *Journal of Aircraft*, Vol. 38, No. 1, 2001, pp. 57-63.

E. Jacobson, M. Z., 2009. Review of solutions to global warming, air pollution, and energy security, Energy Environ. Sci., 2, 148-173.

F. Simms, D., Schreck, S., Hand, M. and Fingersh, L. J. 2001. "NREL Unsteady Aerodynamics Experiment in the NASA-Ames Wind Tunnel: A Comparison of Predictions to Measurements" National Renewable Energy Laboratory, NREL/TP-500-29494.

G. Lee, Y. S., A. F. Vakakis, L. A. Bergman, D. M. McFarland, and G. Kerschen, "Enhancing Robustness of Aeroelastic Instability Suppression Using Multi-Degree-of-Freedom Nonlinear Energy Sinks," AIAA Journal, 46 (6), 1371-1394, 2008.

H. Lindenberg, S., Smith, B., O'Dell, K., and E. DeMeo (2008) "20% Wind Energy by 2030: Increasing Wind Energy's Contribution to U.S. Electricity Supply." *DOE/GO*-102008-2567.

I. Loth, J. L. (1978) "Over-speed Control Arrangement for Vertical Axis Wind Turbine, U.S. Pat. No. 4,105,363.

J. Simms, D. A.; Hand, M. M.; Fingersh, L. J., Jager, D. W. 1999. Unsteady Aerodynamics Experiment Phases IIIV Test Configurations and Available Data Campaigns", NREL/TP-500-25950.

K. Wilson "Wind Turbine Aerodynamics, Part A Basic Principles" in "Wind Turbine Technology", edited by Spera, D. A., ASME Press, New York, N.Y., 2009.

L. Rasmussen, F., Petersen, J. T., Volund, P. Leconte, P, Szechenyi, E and Westergaard, C. "Soft Rotor Design for Flexible Turbines", Riso National Laboratory, Roskilde, Denmark, Contract JOU3-CT95-0062.

M. Wilson, D., D. Berg, D. Lobiittz, & J. Zayas, "Optimized Active Aerodynamic Blade Control for Load Alleviation on Large Wind Turbines," *AWEA Windpower* 2008.

N. U.S. Patent Application Publication No. US 2008/0240923 A1, Bonnet, L., "Rotor Blade for a Wind Turbine Having a Variable Dimension", Oct. 2, 2008.

O. U.S. Patent Application Publication No. US 2010/0028161 A1, Vronsky, et al., "Segmented Rotor Blade Extension Portion", Feb. 4, 2010.

P. U.S. Patent Application Publication No. US 2010/0143143 A1, Judge, P., "Segmented Wind Turbine Blade", Jun. 10, 2010.

Q. U.S. Pat. No. 7,740,453 B2, Zirin, et al., "Multi-Segment Wind Turbine Blade and Method for Assembling the Same", Jun. 22, 2010.

R. U.S. Patent Application Publication No. US 2008/0124216 A1, Liao, N., "Turbine Blade Assembly", May 29, 2008.

S. U.S. Patent Application Publication No. US 2007/0098555 A1, Siegfriedsen, S., "Wind Turbine Comprising Elastically Flexible Rotor Blades", May 3, 2007.

T. U.S. Pat. No. 3,981,613, Ehrenskjold, et al., "Foldable Propellers", Sep. 21, 1976.

U. U.S. Pat. No. 4,403,916, Skelskey, D., "Wind Turbines", Sep. 13, 1983.

V. U.S. Patent Application Publication No. US 2010/0172759 A1, Sullivan, J., "Retractable Wind Turbines", Jul. 8, 2010.

W. U.S. Patent Application Publication No. US 2009/0162208 A1, Zirin, et al., "Multi-Segment Wind Turbine Blade and Method for Assembling the Same", Jun. 25, 2009.

X. U.S. Patent Application Publication No. US 2009/0208337 A1, Chambers, et al., "Turbine Blade Support Assembly", Aug. 20, 2009.

Y. International Patent Application Serial No. WO 2009/130212 A1, Fuglsang, L., "Upwind Wind Turbine with Blades Supported on the Leeward Side", Oct. 29, 2009.

Z. European Patent Application Publication No. EP 1,953,383 A1, Llorente, Gonzalez, et al., "Split-Blade for Wind Generators", Aug. 6, 2008.

AA. U.S. Patent Application Publication No. US 2010/0040477 A1, Moehring, M., "Wind Turbine with Additional Blade-End Support", Feb. 18, 2010.

BB. U.S. Patent Application Publication No. US 2010/0086407 A1, Holmoy, V., "Wind Turbine Rotor", Apr. 8, 2010.

CC. U.S. Patent Application Publication No. US 2010/0132884 A1, Baehmann, et al., "Method for Assembling Jointed Wind Turbine Blade", Jun. 3, 2010.

DD. International Patent Application Publication No. WO 2009/135902 A2, Hancock, M., "A Sectional Blade", Nov. 12, 2009.

EE. Jordan, P., et al., "Segmented and Self-Adjusting Wind Turbine Rotors", 12th IECEC, 1977, pgs. 1676-83.

FF. U.S. Patent Application Publication 2010/0143131 A1, Pitre, J., "Folding Blade Turbine", Jun. 10, 2010.

In summary, while the present invention has been described with respect to specific embodiments, many modifications, variations, alterations, substitutions, and equivalents will be apparent to those skilled in the art. The present invention is not to be limited in scope by the specific embodiment described herein. Indeed, various modifications of the present invention, in addition to those described herein, will be apparent to those of skill in the art from the foregoing description and accompanying drawings. Accordingly, the invention is to be considered as limited only by the spirit and scope of the following claims, including all modifications and equivalents.

Still other embodiments will become readily apparent to those skilled in this art from reading the above-recited detailed description and drawings of certain exemplary embodiments. It should be understood that numerous variations, modifications, and additional embodiments are possible, and accordingly, all such variations, modifications, and embodiments are to be regarded as being within the spirit and scope of this application. For example, regardless of the content of any portion (e.g., title, field, background, summary, abstract, drawing figure, etc.) of this application, unless clearly specified to the contrary, there is no requirement for the inclusion in any claim herein or of any application claiming priority hereto of any particular described or illustrated activity or element, any particular sequence of such activities, or any particular interrelationship of such elements. Moreover, any activity can be repeated, any activity can be performed by multiple entities, and/or any element can be duplicated. Further, any activity or element can be excluded, the sequence of activities can vary, and/or the interrelationship of elements can vary. Unless clearly specified to the contrary, there is no requirement for any particular described or illustrated activity or element, any particular sequence or such activities, any particular size, speed, material, dimension or frequency, or any particularly interrelationship of such elements. Accordingly, the descriptions and drawings are to be regarded as illustrative in nature, and not as restrictive. Moreover, when any number or range is described herein, unless clearly stated otherwise, that number or range is approximate. When any range is described herein, unless clearly stated otherwise, that range includes all values therein and all sub ranges therein. Any information in any material (e.g., a United States/foreign patent, United States/foreign patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such incorporated by reference material is specifically not incorporated by reference herein.

The invention claimed is:

1. A wind turbine comprising:
   at least two downwind-morphing rotor blades, each rotor blade configured to aeroelastically deflect flapwise in a downwind direction in a load-dependent manner to establish a specified downwind deflection angle at rated load using the aeroelastic deflection, to align the rotor blade with a load path defined by a contribution of forces including aerodynamic thrust force, centrifugal force, and gravitational force; and
   a support tower;
   wherein each of the at least two downwind-morphing rotor blades comprises a segmented configuration including at least two segments, the two segments including a first segment defining a root section and a second segment defining a blade tip; and
   wherein respective segments amongst the at least two segments controllably unlock in a sequential matter to establish respective angles of load-aligned deflection.

2. The wind turbine of claim 1, wherein the deflection of the rotor blades is established at least in part using a hub coupling to set the rotor blades at an angle extending in the downwind direction.

3. The wind turbine of claim 2, wherein the respective rotor blades are set at an initial downwind angle at the hub, relative to an axis of a rotation plane about the hub in the downwind direction.

4. The wind turbine of claim 2, wherein the hub is tilted with respect to a gravitational plane to establish a specified rotor angle.

5. The wind turbine of claim 1, wherein the downwind deflection of the respective rotor blades vary within the specified range depending on rotational positions of the respective blades about a hub.

6. The wind turbine of claim 1, wherein the at least two segments are coupled together to define a pre-aligned configuration oriented in the downwind direction.

7. The wind turbine of claim 1, wherein the second segment is configured to unlock first.

8. The wind turbine of claim 1, wherein at least the blade tip of the rotor blade is configured to deflect into a stowed configuration toward a horizontal alignment.

9. The wind turbine of claim 1, wherein the support tower comprises an aerodynamic fairing.

10. The wind turbine of claim 9, wherein a rotational position of the aerodynamic fairing is variable in response to an incident wind direction.

11. The wind turbine of claim 1, wherein the support tower comprises a truss structure.

12. The wind turbine of claim 11, wherein the truss structure includes a tripod-configuration of elongated supports extending from a generator housing to a surface below the wind turbine.

13. The wind turbine of claim 12, wherein the surface comprises water and wherein the support tower is configured as a floating platform.

14. The wind turbine of claim 13, wherein the floating platform is moored using a cable.

* * * * *